(12) United States Patent
Xia et al.

(10) Patent No.: US 9,733,815 B2
(45) Date of Patent: Aug. 15, 2017

(54) SPLIT-SCREEN DISPLAY METHOD AND APPARATUS, AND ELECTRONIC DEVICE THEREOF

(71) Applicant: Huawei Technologies Co., Ltd., Shenzhen (CN)

(72) Inventors: Lin Xia, Shenzhen (CN); Dedong Wang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 60 days.

(21) Appl. No.: 14/285,965

(22) Filed: May 23, 2014

(65) Prior Publication Data

US 2014/0351748 A1 Nov. 27, 2014

Related U.S. Application Data

(63) Continuation of application No. PCT/CN2013/084134, filed on Sep. 24, 2013.

(30) Foreign Application Priority Data

May 24, 2013 (CN) .......................... 2013 1 0198643

(51) Int. Cl.
*G06F 3/0484* (2013.01)
*G06F 3/0481* (2013.01)
*G06F 3/0488* (2013.01)

(52) U.S. Cl.
CPC ........ *G06F 3/04847* (2013.01); *G06F 3/0481* (2013.01); *G06F 3/0488* (2013.01); *G06F 3/04886* (2013.01); *G06F 2203/04803* (2013.01)

(58) Field of Classification Search
CPC ..... G06F 3/0484; G06F 3/0481; G06F 3/0488
See application file for complete search history.

(56) References Cited

U.S. PATENT DOCUMENTS

| 2003/0046671 A1* | 3/2003 | Bowen | G06F 17/5045 |
| | | | 717/141 |
| 2004/0056903 A1* | 3/2004 | Sakai | G06F 17/30126 |
| | | | 715/853 |

(Continued)

FOREIGN PATENT DOCUMENTS

| CN | 101042624 A | 9/2007 |
| CN | 102117169 A | 7/2011 |

(Continued)

OTHER PUBLICATIONS

Foreign Communication From A Counterpart Application, Chinese Application No. 10420478940, Chinese Office dated May 24, 2013, 15 pages.

(Continued)

*Primary Examiner* — David Choi
(74) *Attorney, Agent, or Firm* — Conley Rose, P.C.

(57) ABSTRACT

A split-screen display method and apparatus, and an electronic device thereof. A horizontal slide signal along a touchscreen or a vertical slide signal along the touchscreen entered by using the touchscreen is obtained; a current display area of the touchscreen is divided, according to the horizontal slide signal, into at least two display windows arranged up and down, or a current display area of the touchscreen is divided, according to the vertical slide signal, into at least two display windows arranged side by side, thereby implementing that multiple application programs are simultaneously displayed on a screen up and down or side by side, and a user does not need to frequently switch between programs, which facilitates user operations.

20 Claims, 15 Drawing Sheets

(56) References Cited

U.S. PATENT DOCUMENTS

| | | | |
|---|---|---|---|
| 2004/0193413 A1* | 9/2004 | Wilson | G06F 3/017 704/243 |
| 2006/0004858 A1 | 1/2006 | Tran et al. | |
| 2006/0020903 A1* | 1/2006 | Wang | G06F 3/0481 715/792 |
| 2009/0199095 A1* | 8/2009 | Nicol, II | G06F 3/0481 715/704 |
| 2009/0322678 A1* | 12/2009 | Lashina | G06Q 30/02 345/158 |
| 2010/0081475 A1* | 4/2010 | Chiang | G06F 3/0483 455/564 |
| 2010/0097338 A1* | 4/2010 | Miyashita | G06F 3/04883 345/173 |
| 2010/0248788 A1 | 9/2010 | Yook et al. | |
| 2010/0309147 A1 | 12/2010 | Fleizach et al. | |
| 2011/0107272 A1* | 5/2011 | Aguilar | G06F 3/04815 715/853 |
| 2011/0167336 A1* | 7/2011 | Aitken | G06F 3/04883 715/239 |
| 2011/0225492 A1* | 9/2011 | Boettcher | G06F 3/0485 715/702 |
| 2011/0258547 A1 | 10/2011 | Symons et al. | |
| 2012/0054640 A1* | 3/2012 | Nancke-Krogh | G06F 9/4843 715/751 |
| 2012/0081310 A1* | 4/2012 | Schrock | G06F 1/1616 345/173 |
| 2012/0081314 A1 | 4/2012 | Sirpal et al. | |
| 2012/0081854 A1* | 4/2012 | Sirpal | G06F 1/1616 361/679.22 |
| 2012/0176322 A1 | 7/2012 | Karmi et al. | |
| 2012/0293433 A1 | 11/2012 | Yamamoto | |
| 2013/0117715 A1* | 5/2013 | Williams | G06F 3/04883 715/835 |
| 2013/0120295 A1 | 5/2013 | Kim et al. | |
| 2013/0125045 A1 | 5/2013 | Sun et al. | |
| 2013/0218464 A1* | 8/2013 | Chen | G01C 21/00 701/533 |
| 2013/0222321 A1* | 8/2013 | Buening | G06F 3/041 345/173 |
| 2013/0222703 A1* | 8/2013 | Yarita | G06F 3/0488 348/734 |
| 2013/0227471 A1* | 8/2013 | Cha | G06F 3/0488 715/790 |
| 2014/0068518 A1 | 3/2014 | Liu et al. | |
| 2014/0208274 A1* | 7/2014 | Smyth | G06F 3/0304 715/863 |
| 2014/0281990 A1* | 9/2014 | Gu | G08B 13/19684 715/719 |
| 2014/0351748 A1* | 11/2014 | Xia | G06F 3/0481 715/798 |

FOREIGN PATENT DOCUMENTS

| | | |
|---|---|---|
| CN | 102541492 A | 7/2012 |
| CN | 102750122 A | 10/2012 |
| CN | 103019609 A | 4/2013 |
| CN | 103049177 A | 4/2013 |
| CN | 103116438 A | 5/2013 |
| EP | 1837748 A1 | 9/2007 |
| JP | 20070257220 A | 10/2007 |
| JP | 2012243116 A | 12/2012 |
| JP | 2014501998 A | 1/2014 |
| KR | 20110063412 A | 6/2011 |
| KR | 20120061064 A | 6/2012 |
| TW | 201013512 A | 4/2010 |
| WO | 2012094656 A1 | 7/2012 |
| WO | 2013060178 A1 | 5/2013 |

OTHER PUBLICATIONS

Foreign Communication From A Counterpart Application, Australian Application No. 2013348880, Australian Office dated Apr. 17, 2015, 8 pages.
Partial English Translation and Abstract of Chinese Patent Application No. CN102750122A, Jun. 24, 2014, 44 pages.
Partial English Translation and Abstract of Chinese Patent Application No. CN102541492, Jun. 24, 2014, 80 pages.
Partial English Translation and Abstract of Chinese Patent Application No. CN102117169, Jun. 24, 2014, 38 pages.
Foreign Communication From A Counterpart Application, PCT Application No. PCT/CN2013/084134, International Report dated Mar. 13, 2014, 7 pages.
Foreign Communication From A Counterpart Application, PCT Application No. PCT/CN2013/084134, Written Opinion Mar. 13, 2014, 12 pages.
Foreign Communication From A Counterpart Application, Chinese Application No. 201310198643.7, Chinese Office Action dated Sep. 16, 2015, 42 pages.
Foreign Communication From A Counterpart Application, Korean Application No. 10-2014-7015376, Korean Office dated Mar. 13, 2015, 5 pages.
Foreign Communication From A Counterpart Application, Korean Application No. 10-2014-7015376, English of Korean Office Action dated Mar. 13, 2015, 3 pages.
Partial English Translation and Abstract of Japanese Patent Application No. JP2007257220, Nov. 18, 2015, 48 pages.
Partial English Translation and Abstract of Japanese Patent Application No. JP2012243116, Nov. 18, 2015, 73 pages.
Partial English Translation and Abstract of Japanese Patent Application No. JP2014501998, Nov. 18, 2015, 39 pages.
Foreign Communication From A Counterpart Application, Japanese Application No. 2015-517601, Japanese Office dated Sep. 15, 2015, 10 pages.
Foreign Communication From A Counterpart Application, Japanese Application No. 2015-517601, English Translation Japanese Office Action dated Sep. 15, 2015, 12 pages.
Foreign Communication From A Counterpart Application, Japanese Application No. 2015-517601, Japanese Office Action dated Feb. 2, 2016, 5 pages.
Foreign Communication From A Counterpart Application, Japanese Application No. 2015-517601, English Translation of Japanese Office Action dated Feb. 2, 2016, 5 pages.
Kikusato, C., et al., "iOS4 Multitasking that Maintains Power Conservation Ability," ASCII dot Technologies Monthly, Japan, Ltd. ASCII Media Works, vol. 15, No. 10, Aug. 24, 2010, pp. 86-91.
Foreign Communication From A Counterpart Application, European Application No. 13854191.7, Extended European Search Report dated Jan. 21, 2016, 5 pages.
Foreign Communication From A Counterpart Application, Russian Application No. 2014129031, Russian Notice of Allowance dated Jul. 20, 2016, 14 pages.
Foreign Communication From A Counterpart Application, Russian Application No. 2014129031, English Translation of Russian Notice of Allowance dated Jul. 20, 2016, 8 pages.

* cited by examiner

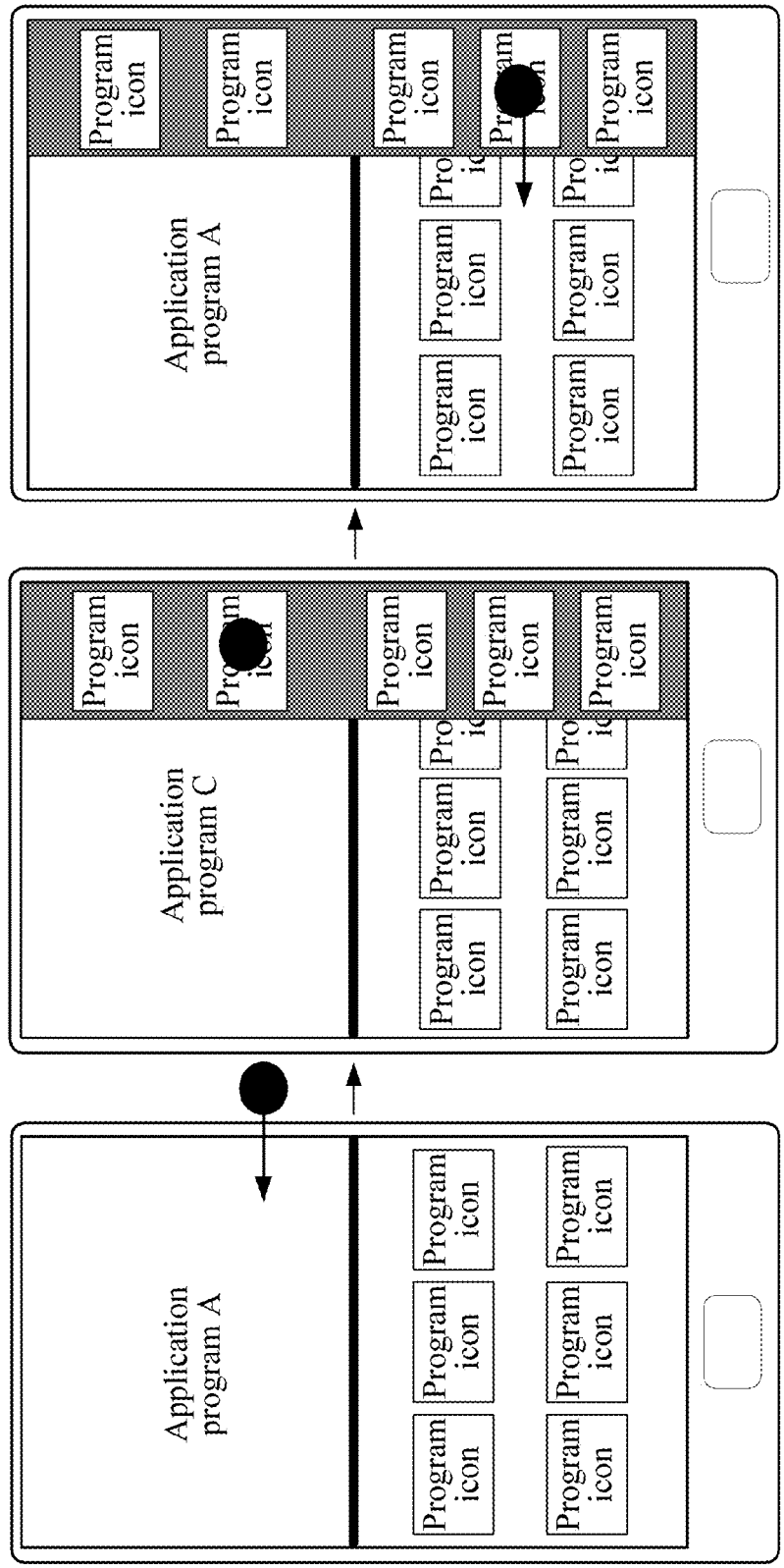

SPLIT-SCREEN DISPLAY METHOD AND APPARATUS, AND ELECTRONIC DEVICE THEREOF

CROSS-REFERENCE TO RELATED APPLICATIONS

This application is a continuation of International Application No. PCT/CN2013/084134, filed on Sep. 24, 2013, which claims priority to Chinese Patent Application No. 201310198643.7, filed on May 24, 2013, both of which are hereby incorporated by reference in their entireties.

TECHNICAL FIELD

The present invention relates to information technologies, and in particular, to a split-screen display method and apparatus, and an electronic device thereof.

BACKGROUND

At present, mobile terminal devices such as smart phones and tablet computers are increasingly popularized. Most of these devices use large screens, and operations are performed by touching the screens.

In the prior art, multiple programs can be started at the background of a terminal, but a screen can display only one application program. If another application program needs to be displayed, it is required to exit or switch a currently displayed application program, which causes inconvenience to user operations.

SUMMARY

In order to solve the problem in the prior art, embodiments of the present invention provide a split-screen display method and apparatus, and an electronic device thereof.

According to a first aspect, an embodiment of the present invention provides a split-screen display method, where the method is applied to an electronic device having a touchscreen, and the method includes: obtaining a screen splitting touch signal entered by using the touchscreen, where the screen splitting touch signal includes a horizontal slide signal along the touchscreen or a vertical slide signal along the touchscreen; and dividing, according to the horizontal slide signal, a current display area of the touchscreen into at least two display windows arranged up and down; or dividing, according to the vertical slide signal, a current display area of the touchscreen into at least two display windows arranged side by side.

With reference to the first aspect, in a first possible implementation manner, the horizontal slide signal indicates a window border shared by any two display windows divided up and down on the touchscreen. The dividing, according to the horizontal slide signal, a current display area of the touchscreen into at least two display windows arranged up and down includes dividing, according to the window border indicated by the horizontal slide signal, the current display area of the touchscreen into at least two display windows with the window border as a shared border and arranged up and down.

With reference to the first aspect, in a second possible implementation manner, the vertical slide signal indicates a window border shared by any two display windows divided side by side on the touchscreen. The dividing, according to the vertical slide signal, a current display area of the touchscreen into at least two display windows arranged side by side includes dividing, according to the window border indicated by the vertical slide signal, the current display area of the touchscreen into at least two display windows with the window border as a shared border and arranged side by side.

With reference to the first aspect or the first possible implementation manner of the first aspect or the second possible implementation manner of the first aspect, in a third possible implementation manner, an included angle between a sliding track formed by a sliding start position and a sliding end position of the horizontal slide signal and a horizontal direction of the touchscreen is less than or equal to a first threshold; and an included angle between a sliding track formed by a sliding start position and a sliding end position of the vertical slide signal and a vertical direction of the touchscreen is less than or equal to a second threshold.

With reference to the first aspect and any one of the first to third possible implementation manners of the first aspect, in a fourth possible implementation manner, the divided display windows separately display a part of display content of the current display area; or, any one of the divided display windows displays all display content of the current display area; or, each of the divided display windows displays all display content of the current display area.

With reference to the fourth possible implementation manner of the first aspect, in a fifth possible implementation manner, the method further includes: obtaining a sliding touch signal from a first display window to a second display window or a sliding touch signal from the second display window to the first display window; and according to the sliding touch signal, switching display content in the first display window to the second display window for displaying, and switching display content in the second display window to the first display window for displaying.

With reference to the first or second possible implementation manner of the first aspect, in a sixth possible implementation manner of the first aspect, the method further includes: obtaining a dragging touch signal for the window border; shifting a position of the window border according to the dragging touch signal for the window border; determining, according to the shifted position of the window border, whether any one display window of the two display windows that share the window border is less than a set size; and if it is determined that the any one display window is less than the set size, closing the display window that is less than the set size, and allocating a display area of the closed display window to the other display window that shares the window border with the closed display window.

With reference to the first aspect, in a seventh possible implementation manner, the touchscreen does not display any started application program in the current display area that has not been divided into display windows. The method further includes: obtaining start signals for at least two application programs; and starting the at least two application programs according to the start signals, where all or a part of the started application programs are separately displayed in one display window of the display windows.

With reference to the seventh possible implementation manner of the first aspect, in an eighth possible implementation manner, the number of the application programs for which the start signals are obtained is less than or equal to the number of the divided display windows. The starting the at least two application programs according to the start signals, where all or a part of the started application programs are separately displayed in one display window of the display windows includes starting the at least two application programs according to the start signals, where each started application program is separately displayed in one display window of the display windows.

With reference to the seventh possible implementation manner of the first aspect, in a ninth possible implementation manner, the number N of the application programs for which the start signals are obtained is greater than the number M of the divided display windows, and M and N are both positive integers. The starting the at least two application programs according to the start signals, where all or a part of the started application programs are separately displayed in one display window of the display windows includes starting the application programs according to a sequence in which the start signals are obtained, where each application program of first M started application programs is separately displayed in one display window of the display windows, and last N-M started application programs run on the background.

With reference to the ninth possible implementation manner of the first aspect, in a tenth possible implementation manner, the method further includes: obtaining an icon displaying touch signal, where the icon displaying touch signal is used for displaying an icon of an application program running on the background; displaying, according to the icon displaying touch signal, icons of the N-M application programs running on the background; obtaining a selection touch signal for any one icon of the icons of the N-M application programs; and switching an application program currently displayed in any one display window of the display windows to run on the background, and displaying the application program corresponding to the selection touch signal in the display window.

With reference to the tenth possible implementation manner of the first aspect, in an eleventh possible implementation manner, the selection touch signal for any one icon of the icons of the N-M application programs is a clicking touch signal for any one icon of the icons of the N-M application programs; or, the selection touch signal for any one icon of the icons of the N-M application programs is a dragging touch signal for dragging any one icon of the icons of the N-M application programs into the any one display window.

With reference to the tenth or eleventh possible implementation manner of the first aspect, in a twelfth possible implementation manner of the first aspect, the method further includes: obtaining a hiding signal for the icons of the N-M application programs running on the background; and according to the hiding signal, stopping displaying the icons of the N-M application programs running on the background.

With reference to any one of the seventh to twelfth possible implementation manners of the first aspect, in a thirteenth possible implementation manner of the first aspect, the start signal for an application program is a clicking touch signal for an icon of an application program in the display window; or, the start signal for an application program is a dragging touch signal for dragging an icon of an application program outside the display window into the display window.

With reference to the first aspect, in a fourteenth possible implementation manner of the first aspect, the touchscreen displays a started first application program in the current display area that has not been divided into display windows, and displays the started first application program in any one display window of the divided display windows; the method further includes obtaining a start signal for at least one second application program, and starting the second application program according to the start signal, where all or a part of the started second application programs are separately displayed in one display window of the display windows.

With reference to the fourteenth possible implementation manner of the first aspect, in a fifteenth possible implementation manner of the first aspect, the number of the second application programs for which the start signals are obtained is less than the number of the divided display windows. The starting the second application program according to the start signal, where all or a part of the started second application programs are separately displayed in one display window of the display windows includes starting the second application program according to the start signal, where each started second application program is separately displayed in one display window of the display windows.

With reference to the fourteenth possible implementation manner of the first aspect, in a sixteenth possible implementation manner of the first aspect, the number N of the second application programs for which the start signals are obtained is greater than or equal to the number M of the divided display windows, and M and N are both positive integers. The starting the second application program according to the start signal, where all or a part of the started second application programs are separately displayed in one display window of the display windows includes starting the second application programs according to a sequence in which the start signals are obtained, where each second application program of first M−1 started second application programs is separately displayed in one display window of the display windows, and last N-M+1 started second application programs run on the background.

With reference to the sixteenth possible implementation manner of the first aspect, in a seventeenth possible implementation manner of the first aspect, the method further includes: obtaining an icon displaying touch signal, where the icon displaying touch signal is used for displaying an icon of an application program running on the background; displaying, according to the icon displaying touch signal, icons of the N-M+1 second application programs running on the background; obtaining a selection touch signal for any one icon of the icons of the N-M+1 second application programs; and switching an application program currently displayed in any one display window of the display windows to run on the background, and displaying the second application program corresponding to the selection touch signal in the display window.

With reference to any one of the fourteenth to seventeenth possible implementation manners of the first aspect, in an eighteenth possible implementation manner of the first aspect, the start signal for a second application program is a clicking touch signal for an icon of a second application program in the display window; or, the start signal for a second application program is a dragging touch signal for dragging an icon of a second application program outside the display window into the display window.

With reference to the first aspect, in a nineteenth possible implementation manner of the first aspect, any one or more display windows of the divided display windows separately display one or more application programs, where the one or more application programs are application programs running on the background before the division.

With reference to the nineteenth possible implementation manner of the first aspect, in a twentieth possible implementation manner of the first aspect, the one or more application programs are selected in descending order of frequencies at which the application programs are used by a user; or, the one or more application programs are selected according to use time of the application programs, from the latest to the earliest.

With reference to the nineteenth or twentieth possible implementation manner of the first aspect, in a twenty-first possible implementation manner of the first aspect, the touchscreen does not display any started application program in the current display area that has not been divided into display windows; or the touchscreen displays a started first application program in the current display area that has not been divided into display windows, where any one display window of the divided display windows displays the first application program.

With reference to the first aspect and any one of the first to twenty-first possible implementation manners of the first aspect, in a twenty-second possible implementation manner of the first aspect, the method further includes: obtaining a split-screen closing touch signal entered by using the touchscreen; and combining at least two display windows of the touchscreen into one display area according to the split-screen closing touch signal, where the display area displays display content of any one of the display windows or displays any combination of content displayed in the display windows.

With reference to the twenty-second possible implementation manner of the first aspect, in a twenty-third possible implementation manner of the first aspect, the split-screen closing touch signal is a slide signal along a window border of any two display windows. The combining at least two display windows of the touchscreen into one display area according to the split-screen closing touch signal includes: combining, according to the slide signal along a window border of any two display windows, the two display windows corresponding to the window border into one display window.

According to a second aspect, an embodiment of the present invention provides a split-screen display apparatus, where the apparatus is applied to an electronic device having a touchscreen, and the apparatus includes: a signal obtaining module, configured to obtain a screen splitting touch signal entered by using the touchscreen, where the screen splitting touch signal includes a horizontal slide signal along the touchscreen or a vertical slide signal along the touchscreen; and a split-screen display module, configured to divide, according to the horizontal slide signal, a current display area of the touchscreen into at least two display windows arranged up and down; or, divide, according to the vertical slide signal, a current display area of the touchscreen into at least two display windows arranged side by side.

With reference to the second aspect, in a first possible implementation manner of the second aspect, the horizontal slide signal indicates a window border shared by any two display windows divided up and down on the touchscreen. The split-screen display module is specifically configured to divide, according to the window border indicated by the horizontal slide signal, the current display area of the touchscreen into at least two display windows with the window border as a shared border and arranged up and down.

With reference to the second aspect, in a second possible implementation manner of the second aspect, the vertical slide signal indicates a window border shared by any two display windows divided side by side on the touchscreen. The split-screen display module is specifically configured to divide, according to the window border indicated by the vertical slide signal, the current display area of the touchscreen into at least two display windows with the window border as a shared border and arranged side by side.

With reference to the second aspect or the first possible implementation manner of the second aspect or the second possible implementation manner of the second aspect, in a third possible implementation manner of the second aspect, an included angle between a sliding track formed by a sliding start position and a sliding end position of the horizontal slide signal and a horizontal direction of the touchscreen is less than or equal to a first threshold; and an included angle between a sliding track formed by a sliding start position and a sliding end position of the vertical slide signal and a vertical direction of the touchscreen is less than or equal to a second threshold.

With reference to the second aspect and any one of the first to third possible implementation manners of the second aspect, in a fourth possible implementation manner of the second aspect, the divided display windows separately display a part of display content of the current display area; or, any one of the divided display windows displays all display content of the current display area; or, each of the divided display windows displays all display content of the current display area.

With reference to the fourth possible implementation manner of the second aspect, in a fifth possible implementation manner of the second aspect, the apparatus further includes a display content switching module. The signal obtaining module is further configured to obtain a sliding touch signal from a first display window to a second display window or a sliding touch signal from the second display window to the first display window; and the display content switching module is configured to, according to the sliding touch signal obtained by the signal obtaining module, switch display content in the first display window to the second display window for displaying, and switch display content in the second display window to the first display window for displaying.

With reference to the first or second possible implementation manner of the second aspect, in a sixth possible implementation manner of the second aspect, the apparatus further includes a window border moving module and a display window closing module, where the signal obtaining module is further configured to obtain a dragging touch signal for the window border; the window border moving module is configured to shift a position of the window border according to the dragging touch signal obtained by the signal obtaining module for the window border; and the display window closing module is configured to, determine, according to the position of the window border shifted by the window border moving module, whether any one display window of the two display windows that share the window border is less than a set size; and if it is determined that the any one display window is less than the set size, close the display window that is less than the set size, and allocate a display area of the closed display window to the other display window that shares the window border with the closed display window.

With reference to the second aspect, in a seventh possible implementation manner of the second aspect, the touchscreen does not display any started application program in the current display area that has not been divided into display windows. The apparatus further includes: an application program starting module, where the signal obtaining module is further configured to obtain start signals for at least two application programs; and the application program starting module is configured to start the at least two application programs according to the start signals, where all or a part of the started application programs are separately displayed in one display window of the display windows.

With reference to the seventh possible implementation manner of the second aspect, in an eighth possible implementation manner of the second aspect, the number of the application programs, for which the signal obtaining module obtains the start signals, is less than or equal to the number of the divided display windows; and the application program starting module is specifically configured to start the at least two application programs according to the start signals, where each started application program is separately displayed in one display window of the display windows.

With reference to the seventh possible implementation manner of the second aspect, in a ninth possible implementation manner of the second aspect, the number N of the application programs, for which the signal obtaining module obtains the start signals, is greater than the number M of the divided display windows, and M and N are both positive integers. The application program starting module is specifically configured to start the application programs according to a sequence in which the start signals are obtained, where each application program of first M started application programs is separately displayed in one display window of the display windows, and last N-M started application programs run on the background.

With reference to the ninth possible implementation manner of the second aspect, in a tenth possible implementation manner of the second aspect, the apparatus further includes an application program icon displaying module and a background application program displaying module, where the signal obtaining module is further configured to obtain an icon displaying touch signal; the application program icon displaying module is configured to display, according to the icon displaying touch signal, icons of the N-M application programs running on the background; the signal obtaining module is further configured to obtain a selection touch signal for any one icon of the icons of the N-M application programs; and the background application program displaying module is configured to switch an application program currently displayed in any one display window of the display windows to run on the background, and display the application program corresponding to the selection touch signal in the display window.

With reference to the tenth possible implementation manner of the second aspect, in an eleventh possible implementation manner of the second aspect, the selection touch signal for any one icon of the icons of the N-M application programs is a clicking touch signal for any one icon of the icons of the N-M application programs; or, the selection touch signal for any one icon of the icons of the N-M application programs is a dragging touch signal for dragging any one icon of the icons of the N-M application programs into any one of the display windows.

With reference to the tenth or eleventh possible implementation manner of the second aspect, in a twelfth possible implementation manner of the second aspect, the signal obtaining module is further configured to obtain a hiding signal for the icons of the N-M application programs running on the background; and the background application program displaying module is configured to, according to the hiding signal, stop displaying the icons of the N-M application programs running on the background.

With reference to any one of the seventh to twelfth possible implementation manners of the second aspect, in a thirteenth possible implementation manner of the second aspect, the start signal for an application program is a clicking touch signal for an icon of an application program in the display window; or, the start signal for an application program is a dragging touch signal for dragging an icon of an application program outside the display window into the display window.

With reference to the second aspect, in a fourteenth possible implementation manner of the second aspect, the touchscreen displays a started first application program in the current display area that has not been divided into display windows, and displays the started first application program in any one display window of the divided display windows. The apparatus further includes: an application program starting module, where the signal obtaining module is further configured to obtain a start signal for at least one second application program; and the application program starting module is configured to start the second application program according to the start signal, where all or a part of the started second application programs are separately displayed in one display window of the display windows.

With reference to the fourteenth possible implementation manner of the second aspect, in a fifteenth possible implementation manner of the second aspect, the number of the second application programs, for which the signal obtaining module obtains the start signals, is less than the number of the divided display windows; and the application program starting module is specifically configured to start the second application program according to the start signal, where each started second application program is separately displayed in one display window of the display windows.

With reference to the fourteenth possible implementation manner of the second aspect, in a sixteenth possible implementation manner of the second aspect, the number N of the second application programs, for which the signal obtaining module obtains the start signals, is greater than or equal to the number M of the divided display windows, and M and N are both positive integers. The application program starting module is specifically configured to start the second application programs according to a sequence in which the start signals are obtained, where each second application program of first M−1 started second application programs is separately displayed in one display window of the display windows, and last N−M+1 started second application programs run on the background.

With reference to the sixteenth possible implementation manner of the second aspect, in a seventeenth possible implementation manner of the second aspect, the apparatus further includes an application program icon displaying module and a background application program displaying module, where the signal obtaining module is further configured to obtain an icon displaying touch signal; the application program icon displaying module is configured to display, according to the icon displaying touch signal, icons of the N−M+1 second application programs running on the background; the signal obtaining module is further configured to obtain a selection touch signal for any one icon of the icons of the N−M+1 second application programs; and the background application program displaying module is configured to switch an application program currently displayed in any one display window of the display windows to run on the background, and display the second application program corresponding to the selection touch signal in the display window.

With reference to any one of the fourteenth to seventeenth possible implementation manners of the second aspect, in an eighteenth possible implementation manner of the second aspect, the start signal for a second application program is a clicking touch signal for an icon of a second application program in the display window; or, the start signal for a second application program is a dragging touch signal for dragging an icon of a second application program outside the display window into the display window.

With reference to the second aspect, in a nineteenth possible implementation manner of the second aspect, any one or more display windows of the divided display windows separately display one or more application programs, where the one or more application programs are application programs running on the background before the division.

With reference to the nineteenth possible implementation manner of the second aspect, in a twentieth possible implementation manner of the second aspect, the one or more application programs are selected in descending order of frequencies at which the application programs are used by a user; or, the one or more application programs are selected according to use time of the application programs, from the latest to the earliest.

With reference to the nineteenth or twentieth possible implementation manner of the second aspect, in a twenty-first possible implementation manner of the second aspect, the touchscreen does not display any started application program in the current display area that has not been divided into display windows; or the touchscreen displays a started first application program in the current display area that has not been divided into display windows, where any one display window of the divided display windows displays the first application program.

With reference to the second aspect and any one of the first to twenty-first possible implementation manners of the second aspect, in a twenty-second possible implementation manner of the second aspect, the apparatus further includes a split-screen closing module, where the signal obtaining module is further configured to obtain a split-screen closing touch signal entered by using the touchscreen; and the split-screen closing module is configured to combine at least two display windows of the touchscreen into one display area according to the split-screen closing touch signal, where the display area displays display content of any one of the display windows or displays any combination of content displayed in the display windows.

With reference to the twenty-second possible implementation manner of the second aspect, in a twenty-third possible implementation manner of the second aspect, the split-screen closing touch signal is a slide signal along a window border of any two display windows. The split-screen closing module is specifically configured to combine, according to the slide signal along a window border of any two display windows, the two display windows corresponding to the window border into one display window.

According to a third aspect, an embodiment of the present invention provides an electronic device, and the device includes a touchscreen and a processor. The touchscreen is configured to obtain a screen splitting touch signal entered by using the touchscreen, and send the screen splitting touch signal to the processor, where the screen splitting touch signal includes a horizontal slide signal along the touchscreen or a vertical slide signal along the touchscreen. The processor is configured to divide, according to the horizontal slide signal, a current display area of the touchscreen into at least two display windows arranged up and down; or, divide, according to the vertical slide signal, a current display area of the touchscreen into at least two display windows arranged side by side.

With reference to the third aspect, in a first possible implementation manner of the third aspect, the horizontal slide signal indicates a window border shared by any two display windows divided up and down on the touchscreen. The processor is specifically configured to divide, according to the window border indicated by the horizontal slide signal, the current display area of the touchscreen into at least two display windows with the window border as a shared border and arranged up and down.

With reference to the third aspect, in a second possible implementation manner of the third aspect, the vertical slide signal indicates a window border shared by any two display windows divided side by side on the touchscreen. The processor is specifically configured to divide, according to the window border indicated by the vertical slide signal, the current display area of the touchscreen into at least two display windows with the window border as a shared border and arranged side by side.

With reference to the third aspect, or the first possible implementation manner or the second possible implementation manner of the third aspect, in a third possible implementation manner of the third aspect, an included angle between a sliding track formed by a sliding start position and a sliding end position of the horizontal slide signal and a horizontal direction of the touchscreen is less than or equal to a first threshold; and an included angle between a sliding track formed by a sliding start position and a sliding end position of the vertical slide signal and a vertical direction of the touchscreen is less than or equal to a second threshold.

With reference to the third aspect and any one of the first to third possible implementation manners of the third aspect, in a fourth possible implementation manner of the third aspect, the divided display windows separately display a part of display content of the current display area; or, any one of the divided display windows displays all display content of the current display area; or, each of the divided display windows displays all display content of the current display area.

With reference to the fourth possible implementation manner of the third aspect, in a fifth possible implementation manner of the third aspect, the touchscreen is further configured to obtain a sliding touch signal from a first display window to a second display window or a sliding touch signal from the second display window to the first display window, and send the sliding touch signal to the processor; and the processor is further configured to, according to the sliding touch signal, switch display content in the first display window to the second display window for displaying, and switch display content in the second display window to the first display window for displaying.

With reference to the first or second possible implementation manner of the third aspect, in a sixth possible implementation manner of the third aspect, the touchscreen is further configured to obtain a dragging touch signal for the window border, and send the dragging touch signal to the processor. The processor is further configured to shift a position of the window border according to the dragging touch signal for the window border; determine, according to the shifted position of the window border, whether any one display window of the two display windows that share the window border is less than a set size; and if it is determined that the any one display window is less than the set size, close the display window that is less than the set size, and allocate a display area of the closed display window to the other display window that shares the window border with the closed display window.

With reference to the third aspect, in a seventh possible implementation manner of the third aspect, the touchscreen does not display any started application program in the current display area that has not been divided into display windows. The touchscreen is further configured to obtain start signals for at least two application programs, and send the start signals to the processor; and the processor is further configured to start the at least two application programs according to the start signals, where all or a part of the started application programs are separately displayed in one display window of the display windows.

With reference to the seventh possible implementation manner of the third aspect, in an eighth possible implementation manner of the third aspect, the number of the application programs, for which the touchscreen obtains the start signals, is less than or equal to the number of the divided display windows; and the processor is specifically configured to start the at least two application programs according to the start signals, where each started application program is separately displayed in one display window of the display windows.

With reference to the seventh possible implementation manner of the third aspect, in a ninth possible implementation manner of the third aspect, the number N of the application programs, for which the touchscreen obtains the start signals, is greater than the number M of the divided display windows, and M and N are both positive integers. The processor is specifically configured to start the application programs according to a sequence in which the start signals are obtained, where each application program of first M started application programs is separately displayed in one display window of the display windows, and last N-M started application programs run on the background.

With reference to the ninth possible implementation manner of the third aspect, in a tenth possible implementation manner of the third aspect of the present invention, the touchscreen is further configured to obtain an icon displaying touch signal, and send the icon displaying touch signal to the processor; the processor is further configured to display, according to the icon displaying touch signal and in the display window, icons of the N-M application programs running on the background; the touchscreen is further configured to obtain a selection touch signal for any one icon of the icons of the N-M application programs, and send the selection touch signal to the processor; and the processor is further configured to switch an application program currently displayed in any one display window of the display windows to run on the background, and display the application program corresponding to the selection touch signal in the display window.

With reference to the tenth possible implementation manner of the third aspect, in an eleventh possible implementation manner of the third aspect of the present invention, the selection touch signal obtained by the touchscreen for any one icon of the icons of the N-M application programs is a clicking touch signal for any one icon of the icons of the N-M application programs; or, the selection touch signal for any one icon of the icons of the N-M application programs is a dragging touch signal for dragging any one icon of the icons of the N-M application programs into any one of the display windows.

With reference to the tenth or eleventh possible implementation manner of the third aspect, in a twelfth possible implementation manner of the third aspect, the touchscreen is further configured to obtain a hiding signal for the icons of the N-M application programs running on the background, and send the hiding signal to the processor; and the processor is further configured to, according to the hiding signal, stop displaying the icons of the N-M application programs running on the background.

With reference to any one of the seventh to twelfth possible implementation manners of the third aspect, in a thirteenth possible implementation manner of the third aspect, the start signal for an application program is a clicking touch signal for an icon of an application program in the display window; or, the start signal for an application program is a dragging touch signal for dragging an icon of an application program outside the display window into the display window.

With reference to the third aspect, in a fourteenth possible implementation manner of the third aspect, the touchscreen displays a started first application program in the current display area that has not been divided into display windows, and displays the started first application program in any one display window of the divided display windows. The touchscreen is further configured to obtain a start signal for at least one second application program, and send the start signal to the processor; and the processor is further configured to start the second application program according to the start signal, where all or a part of the started second application programs are separately displayed in one display window of the display windows.

With reference to the fourteenth possible implementation manner of the third aspect, in a fifteenth possible implementation manner of the third aspect, the number of the second application programs, for which the touchscreen obtains the start signals, is less than the number of the divided display windows; and the processor is specifically configured to start the second application program according to the start signal, where each started second application program is separately displayed in one display window of the display windows.

With reference to the fourteenth possible implementation manner of the third aspect, in a sixteenth possible implementation manner of the third aspect, the number N of the second application programs, for which the touchscreen obtains the start signals, is greater than or equal to the number M of the divided display windows, and M and N are both positive integers. The processor is specifically configured to start the second application programs according to a sequence in which the start signals are obtained, where each second application program of first M−1 started second application programs is separately displayed in one display window of the display windows, and last N-M+1 started second application programs run on the background.

With reference to the sixteenth possible implementation manner of the third aspect, in a seventeenth possible implementation manner of the third aspect, the touchscreen is further configured to obtain an icon displaying touch signal, and send the icon displaying touch signal to the processor; the processor is further configured to display, according to the icon displaying touch signal, icons of the N-M+1 second application programs running on the background; the touchscreen is further configured to obtain a selection touch signal for any one icon of the icons of the N-M+1 second application programs; and the processor is further configured to switch an application program currently displayed in any one display window of the display windows to run on the background, and display the second application program corresponding to the selection touch signal in the display window.

With reference to any one of the fourteenth to seventeenth possible implementation manners of the third aspect, in an eighteenth possible implementation manner of the third aspect, the start signal for a second application program is a clicking touch signal for an icon of a second application program in the display window; or, the start signal for a second application program is a dragging touch signal for dragging an icon of a second application program outside the display window into the display window.

With reference to the third aspect, in a nineteenth possible implementation manner of the third aspect, any one or more display windows of the divided display windows separately display one or more application programs, where the one or more application programs are application programs running on the background before the division.

With reference to the nineteenth possible implementation manner of the third aspect, in a twentieth possible implementation manner of the third aspect, the one or more application programs are selected in descending order of frequencies at which the application programs are used by a user; or, the one or more application programs are selected according to use time of the application programs, from the latest to the earliest.

With reference to the nineteenth or twentieth possible implementation manner of the third aspect, in a twenty-first possible implementation manner of the third aspect, the touchscreen does not display any started application program in the current display area that has not been divided into display windows; or the touchscreen displays a started first application program in the current display area that has not been divided into display windows, where any one display window of the divided display windows displays the first application program.

With reference to the third aspect and any one of the first to twenty-first possible implementation manners of the third aspect, in a twenty-second possible implementation manner of the third aspect, the touchscreen is further configured to obtain a split-screen closing touch signal entered by using the touchscreen, and send the split-screen closing touch signal to the processor. The processor is further configured to combine at least two display windows of the touchscreen into one display area according to the split-screen closing touch signal, where the display area displays display content of any one of the display windows or displays any combination of content displayed in the display windows.

With reference to the twenty-second possible implementation manner of the third aspect, in a twenty-third possible implementation manner of the third aspect, the split-screen closing touch signal is a slide signal along a window border of any two display windows. The processor is specifically configured to combine, according to the slide signal along a window border of any two display windows, the two display windows corresponding to the window border into one display window.

It can be seen that, in the split-screen display method, apparatus, and electronic device provided by the embodiments of the present invention, a horizontal slide signal along the touchscreen or a vertical slide signal along the touchscreen entered by using the touchscreen is obtained; a current display area of the touchscreen is divided into at least two display windows arranged up and down according to the horizontal slide signal, or a current display area of the touchscreen is divided into at least two display windows arranged side by side according to the vertical slide signal, thereby implementing that multiple application programs are simultaneously displayed on the screen up and down or side by side, and a user does not need to switch frequently among programs, which facilitates user operations.

BRIEF DESCRIPTION OF DRAWINGS

To describe the technical solutions in the embodiments of the present invention more clearly, the following briefly introduces the accompanying drawings required for describing the embodiments. The accompanying drawings in the following description show merely some embodiments of the present invention, and persons of ordinary skill in the art may still derive other drawings from these accompanying drawings without creative efforts.

FIGS. 10A-10F are schematic diagrams of switching a background application program to a current display window according to an embodiment of the present invention;

DESCRIPTION OF EMBODIMENTS

To make the objectives, technical solutions, and advantages of the embodiments of the present invention more clear, the following clearly describes the technical solutions in the embodiments of the present invention with reference to the accompanying drawings in the embodiments of the present invention. The described embodiments are a part rather than all of the embodiments of the present invention. All other embodiments obtained by persons of ordinary skill in the art based on the embodiments of the present invention without creative efforts shall fall within the protection scope of the present invention.

Figure 1:
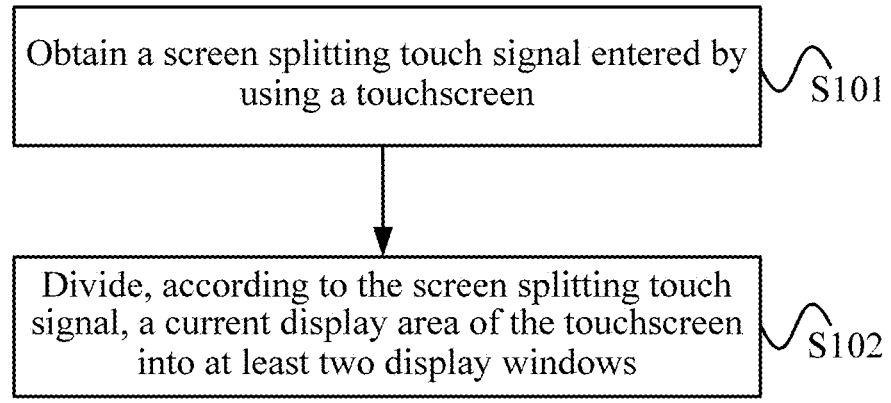
FIG. 1 is a flowchart of Embodiment 1 of a split-screen display method according to an embodiment of the present invention.

FIG. 1 is a flowchart of Embodiment 1 of a split-screen display method according to an embodiment of the present invention. The method can be applied to an electronic device having a touchscreen, such as, a mobile phone, a personal digital assistant (PDA), MP3, MP4, or a desktop computer. The split-screen display method according to the embodiment of the present invention is executed by the foregoing electronic device, and specifically may be implemented by using a module or chip that provides a processing function in the foregoing electronic device, such as a central processing unit (CPU). As shown in FIG. 1, the split-screen display method according to this embodiment includes the following steps:

S101: Obtain a screen splitting touch signal entered by using a touchscreen.

The screen splitting touch signal is a touch signal for dividing a current display area. In an implementation manner, the screen splitting touch signal may be a horizontal slide signal along the touchscreen, and according to the horizontal slide signal, the current display area of the touchscreen is divided into at least two display windows arranged up and down. For example, a signal generated when a user slides a finger from left to right on the touchscreen may be used as a screen splitting touch signal, and the horizontal slide signal indicates a window border shared by any two display windows arranged up and down on the touchscreen. In another implementation manner, the screen splitting touch signal may also be a vertical slide signal along the touchscreen. A signal generated when a user slides a finger from top to bottom on the touchscreen may be used as a screen splitting touch signal, and the current display area of the touchscreen is divided into at least two display windows arranged side by side according to the vertical slide signal. The vertical slide signal may be used for indicating a window border shared by any two display windows arranged side by side on the touchscreen.

Certainly, an initial position of the window border may also be irrelevant to a sliding operation of the user, and may be a set default position. For example, the default position of the window border is a middle position of the screen in the vertical direction or a middle position of the screen in the horizontal direction, and at this time, wherever the user executes the foregoing screen splitting touch signal, the foregoing default position is used as the initial position of the window border.

Figure 2A:
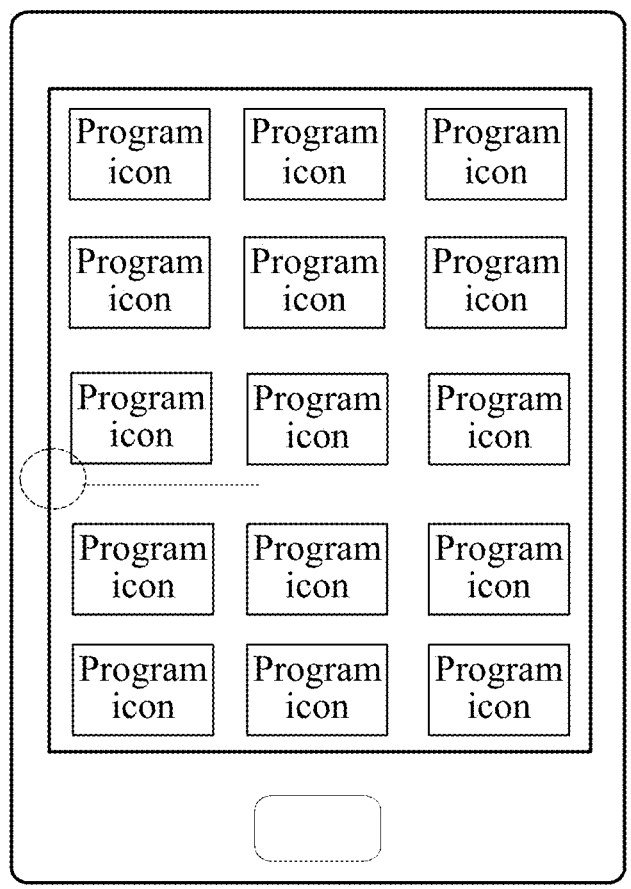
FIG. 2A to FIG. 2D are schematic diagrams of an action of sliding horizontally along a touchscreen.
Figure 2B:
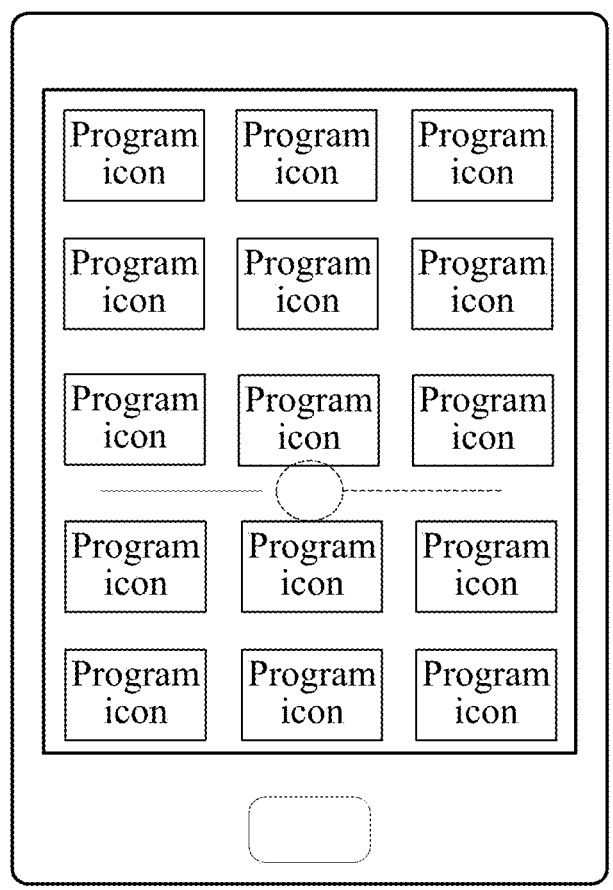
Figure 2C:
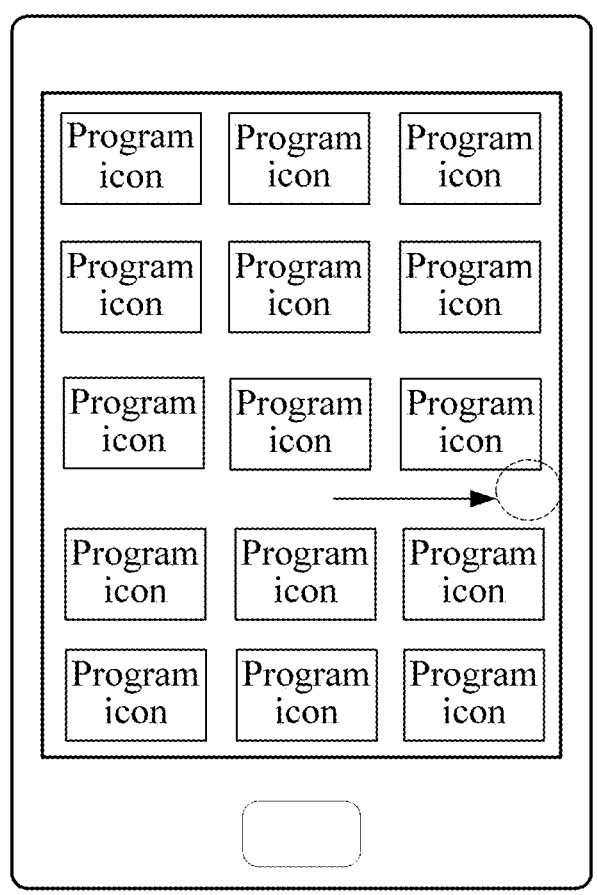
Figure 2D:
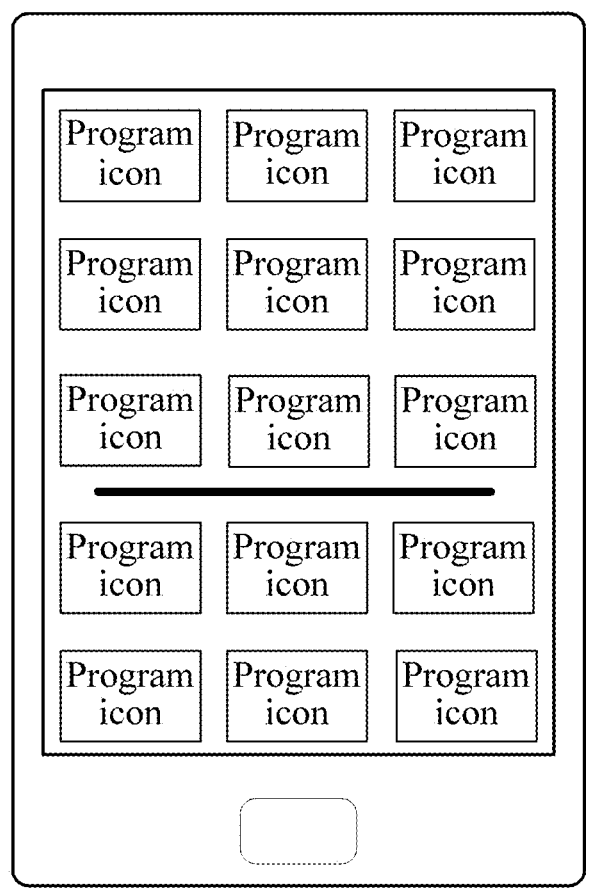

FIG. 2A to FIG. 2D are schematic diagrams of an action of sliding horizontally along a touchscreen. In the figures, there are multiple application program icons in a current display area, and in the dashed line circle is a track of the sliding operation, which starts from the right-most side of the touchscreen and slides horizontally to the left-most side. The touchscreen is divided into two display windows, and the bold black solid line in FIG. 2D represents the window border after the screen is split. For the screen splitting touch signal generated by the sliding, to avoid other sliding misoperations of the user, it can be limited that the sliding is used as the screen splitting touch signal only when the user slides from a left edge to a right edge of the screen, or slides from a top edge to a bottom edge of the screen, or slides to a two-thirds position or half position of the screen.

Specifically, the touchscreen has a two-dimensional or three-dimensional coordinate system, and for any operation entered by the user by using the touchscreen, a coordinate corresponding to the operation can be obtained to identify a position of the operation on the touchscreen. In the embodiment of the present invention, by obtaining a start coordinate and an end coordinate of a sliding operation of the user, a straight sliding track of the user from a sliding start position to a sliding end position can be calculated, and it is determined whether the sliding track is horizontal or vertical according to an included angle between the straight sliding track and a corresponding direction. If it is determined that the sliding track is a horizontal slide, and a length of the sliding track is greater than two-thirds (this value can be set according to requirements) of the screen, it is determined that this sliding operation is a horizontal screen splitting touch signal, and the current display area is split according to the signal. Vertical sliding is similar, and is not described herein again.

For example, a first threshold is preset, and the first threshold may be a specific value, such as 5°, and may also be a range, such as [−5, 5°]. It is determined whether an included angle between the sliding track formed by the sliding start position and sliding end position of the horizontal slide signal and the horizontal direction of the touchscreen is less than or equal to the first threshold, and if yes, it is determined that the screen splitting touch signal is a horizontal slide signal; in the same manner, it is determined whether an included angle between the sliding track formed by the sliding start position and sliding end position of the vertical slide signal and the vertical direction of the touchscreen is less than or equal to a second threshold (the meaning of which is similar to the first threshold), and if yes, it is determined that the screen splitting touch signal is a vertical slide signal.

In other implementation manners, the user may send a screen splitting signal to the touchscreen of the electronic device by pressing a "split screen" button, and the electronic device divides, according to the screen splitting touch signal, a current display area of the touchscreen into at least two display windows with a default window border as a boundary. The default window border is a window border that is preset by the electronic device and will be used during window division. For example, after the user clicks the "split screen" button, by default, the electronic device divides the current rectangular display area into two rectangular display windows of a same size. The two display windows are arranged up and down and share a window border, and in this case, the default window border is actually located at the middle position of the original rectangular display area in the vertical direction.

S102: Divide, according to the screen splitting touch signal, a current display area of the touchscreen into at least two display windows.

When the screen splitting touch signal is only used for indicating screen splitting, the current display area of the touchscreen is divided into at least two display windows along the default window border according to the screen splitting touch signal. In this implementation manner, whatever screen splitting touch signal is entered, the current display area is divided into at least two display windows along the default window border.

When the screen splitting touch signal indicates a window border shared by any two display windows, according to the window border indicated by the screen splitting touch signal, the current display area of the touchscreen is divided into at least two display windows that use the window border as a boundary. For example, according to the window border indicated by the horizontal slide signal, the current display area of the touchscreen is divided into at least two touchscreen display windows with the window border as a shared border and arranged up and down; or, according to the window border indicated by the vertical slide signal, the current display area of the touchscreen is divided into at least two display windows with the window border as a shared border and arranged side by side. In this implementation manner, a display window is divided along the window border indicated by the screen splitting touch signal. For example, if the window border indicated by the screen splitting touch signal is located at a one-third position of the current display window, one of the two divided display windows occupies one-third of the current display area, and the other occupies two-thirds of the current display area.

After the screen splitting touch signal entered by the user is obtained, the touchscreen is divided into at least two display windows. A specific division manner for a display window and the number of divided display windows are not limited herein, for example, may be up-and-down division along the touchscreen, and may also be side-by-side division along the touchscreen. The divided display windows may have same or different sizes, and adjacent display windows may be distinguished from each other by using a display window border (for example, a bold or highlighted display window border).

Here, a specific implementation manner is provided according to the foregoing example, and it can be understood that the specific implementation manner of the present invention is not limited thereto. The user enters a horizontal slide signal by using the touchscreen, and then two window controls are generated and presented on the touchscreen. The two window controls are displayed in a tiled manner, and the window controls have attribute information such as a size and a position. A window border shared by the two window controls is an independent border control. The border control has an independent attribute, and can be operated independently. Moreover, an initial position of the border control is the same as a position of the horizontal slide signal. The border control can further receive a signal of the touchscreen and transfer the signal to the two window controls. For example, the border control receives a dragging touch signal of the user and transfers the dragging touch signal to the two window borders. Attributes such as sizes (a border position, such as a position of a left, right, top, or bottom border, of a control can be used for indicating a size) or positions of the two window controls change according to the dragging touch signal, and at the same time, the position of the border control also changes along with the position of the dragging touch signal.

It can be seen that, in the split-screen display method according to this embodiment, a screen splitting touch signal of a user is obtained, and a touchscreen is divided into at least two display windows according to the screen splitting touch signal. A display area of the touchscreen is divided into multiple display windows, and each display window may display one application program. Therefore, it is implemented that multiple application programs are simultaneously displayed on the screen by using multiple display windows, and the user does not need to switch frequently between programs, which facilitates user operations.

By means of S102, the current display area is divided into at least two display windows, and the divided display windows separately displays a part of display content of the current display area; or, any one of the divided display windows displays all display content of the current display area, and other display windows may not display the display content of the current display area; or, each of the divided display windows displays all display content of the current display area. For example, a current display window displays a home interface. After the current display window is divided into two display windows arranged up and down, a window border is shared by the two display windows; and the two divided display windows separately display a part of display content of the home interface, or, the display window located above the window border displays all display content of the home interface, and the display window below the window border does not display the display content of the home interface, and certainly it may also be that the display window located below the window border displays all display content of the home interface, and the display window above the window border does not display the display content of the home interface, or, the two display windows both display all display content of the home interface.

In the embodiment provided by the present invention, the size of each display window may further be adjusted. By obtaining a dragging touch signal for the window border, a position of the window border is shifted according to the dragging touch signal for the window border, and adjustment to a size attribute of a display window is triggered by shifting the position of the window border. According to the shifted position of the window border, it can further be determined whether any one display window of the two display windows that share the window border is less than a set size; if it is determined that the any one display window is less than the set size, the display window less than the set size is closed, and a display area of the closed display window is allocated to the other display window that shares the window border with it. For specific implementation, reference may be made to the descriptions of the foregoing "border control" and "window control", which are not described herein again.

It should be noted that, the foregoing "set size" may be a specific value, and may also be a value range. For example, as the user drags the window border, the area of one of the display windows is less than one-fifth of a total area of the display area. In this case, it is considered that the user does not want to view the display window anymore; therefore, the display window is closed automatically, and the display area of the other display window is expanded to the entire display area.

Figure 3:
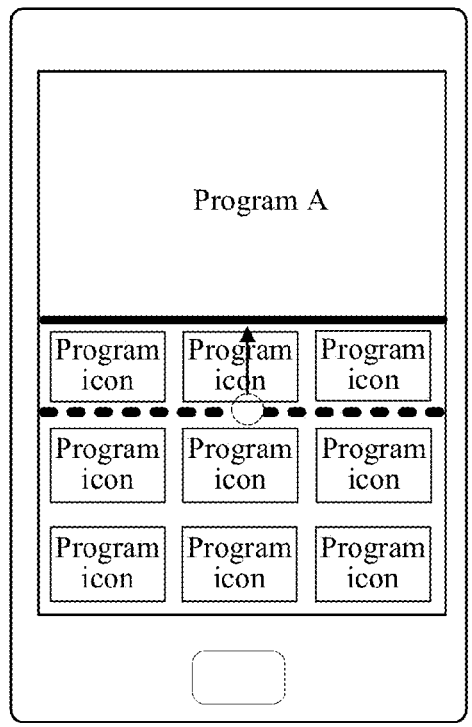
FIG. 3 is a schematic diagram of an action of adjusting a window size according to an embodiment of the present invention.

The dragging touch signal is entered by the user. For example, the user touches and holds the window border between the display windows with a finger, and drags the window border up and down to an appropriate position. FIG. 3 is a schematic diagram of an action of adjusting a window size according to an embodiment of the present invention. As shown in FIG. 3, the user touches and holds the window border, that is, the position of the dashed line circle in the figure, with a finger, and then drags the window border from the black dashed line to the solid line in the figure, thereby implementing adjustment to the window size. Then, it is determined, according to the position of the window border, whether any one display window of the two adjacent display windows is less than the set size. If any one display window of the two adjacent display windows is less than the set size, the display window less than the set size is closed; moreover, an application program displayed in this display window is suspended, and the display area of the closed display window is allocated to the other display window. For example, when there are only two display windows on the screen, after a display window less than the set size is closed, an application program in the display window may be suspended (running on the background), and an application program in the other display window occupies the entire screen in a tiled manner as the size of the display window is adjusted.

In the embodiment of the present invention, when the touchscreen displays multiple application programs, display content in two adjacent display windows may be switched by using the following method.

First, a sliding touch signal from a first display window to a second display window or a sliding touch signal from the second display window to the first display window is obtained. Then, according to the sliding touch signal, display content in the first display window is switched to the second display window for displaying, and display content in the second display window is switched to the first display window for displaying. For example, the display area of the touchscreen is divided into two display windows arranged up and down, namely, the first display window and the second display window, where the first display window is located above a window border, and the second display window is located below the window border. When application programs in the two display windows need to be exchanged, the user slides a finger from the first display window to the second display window, or the user slides a finger from the second display window to the first display window, or the user simultaneously slides two fingers from one display window to the other display window separately, and all the foregoing three manners can implement switching of the display content of the two adjacent display windows. After obtaining the sliding touch signal, a device switches an application program displayed in the first display window to the second display window for displaying, and switches an application program displayed in the second display window to the first display window for displaying, and therefore switching of the display content in the two display windows can be completed conveniently.

The sliding touch signal herein may be determined according to a start position coordinate, an end position coordinate, and a sliding track of the sliding of the user. For example, if the start position (namely, the start position of the sliding track) coordinate of the sliding of the user is located inside a first display window control, the end position coordinate of the sliding of the user is located inside a second display window control, and the sliding track is a continuous curve or a straight line, it is determined that the sliding touch signal is a sliding touch signal from the first display window to the second display window, and a corresponding display content switching operation is performed according to the sliding touch signal. Display content in different display windows may be implemented by using links of the display windows. Content pointed to by a link of a display window is content currently displayed in this display window. Under instruction of a switching instruction, the content pointed to by the link of the display window changes, and therefore, the content currently displayed in the display window also changes.

Figure 4:
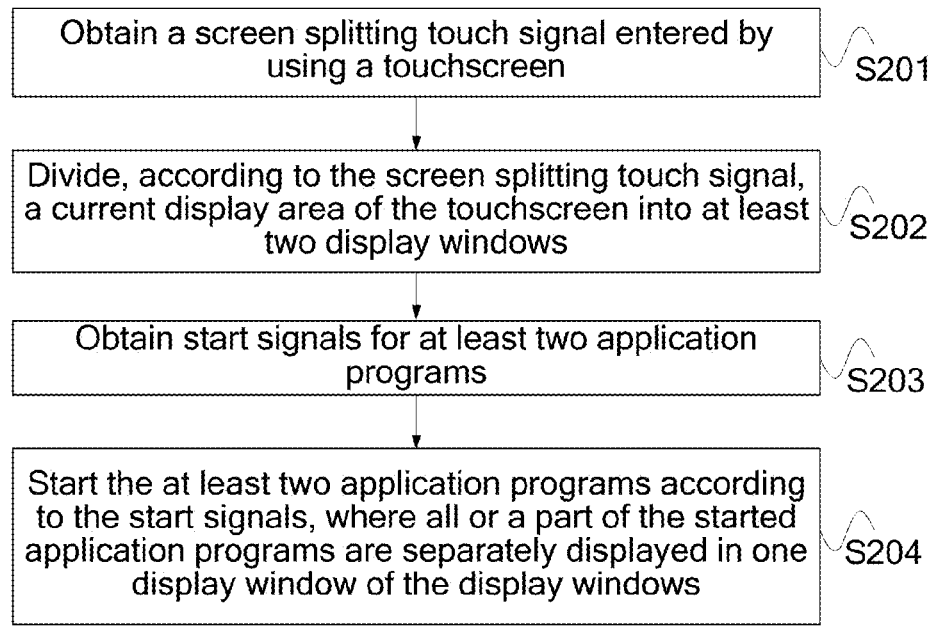
FIG. 4 is a flowchart of Embodiment 2 of a split-screen display method according to an embodiment of the present invention.

FIG. 4 is a flowchart of Embodiment 2 of a split-screen display method according to an embodiment of the present invention. Based on Embodiment 1, Embodiment 2 of the present invention describes the screen-split display method in detail by using an example in which a touchscreen does not display any started application program in a current display area that has not been divided into display windows. The method according to this embodiment includes the following steps:

S201: Obtain a screen splitting touch signal entered by using a touchscreen.

The screen splitting touch signal is a horizontal slide signal along the touchscreen or a vertical slide signal along the touchscreen. In an actual application, a user enters the screen splitting touch signal by using the touchscreen. For example, in an open Home interface, the user slides a finger rightwards from the left-most side out of the screen to the right-most side or a two-thirds position of the screen, and a generated signal is used as the screen splitting touch signal. A terminal device obtains the screen splitting touch signal entered by the user, where the screen splitting touch signal responds to this operation in any state after the screen is unlocked. However, the present invention is not limited thereto. According to different settings, a signal generated when the user slides a finger leftwards to a half position of the screen may also be used as the screen splitting touch signal. It can be understood that, a specific manner for generating the screen splitting touch signal is not limited herein.

S202: Divide, according to the screen splitting touch signal, a current display area of the touchscreen into at least two display windows.

Figure 5:
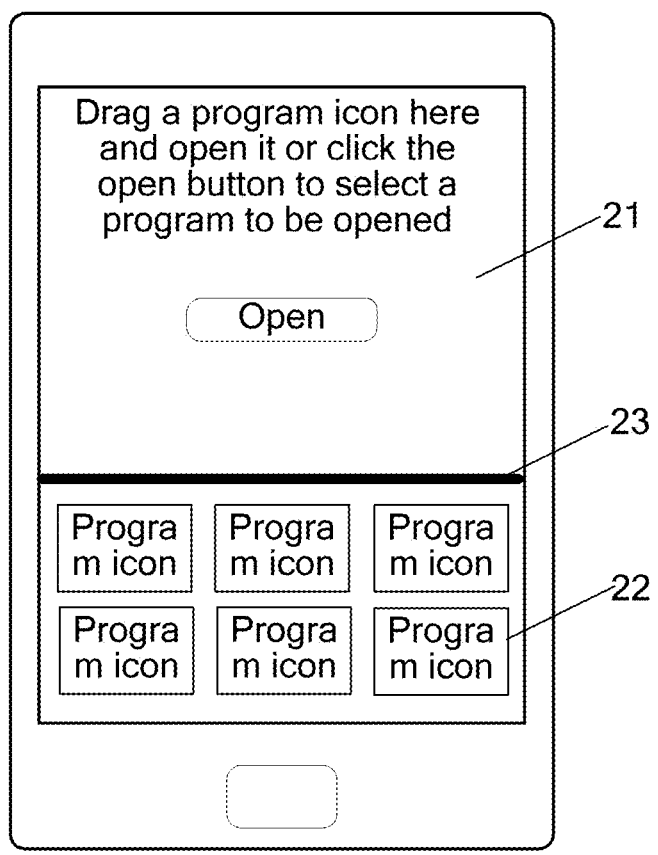
FIG. 5 is a schematic diagram of display windows after a screen of an electronic device is split according to an embodiment of the present invention.

After the screen splitting touch signal is obtained, the display area of the touchscreen is divided into two display windows (as shown in FIG. 5) according to the screen splitting touch signal. FIG. 5 is a schematic diagram of display windows after a screen of an electronic device is split according to an embodiment of the present invention. As shown in FIG. 5, display windows after the screen is split are marked as a first display window 21 and a second display window 22, where a window border 23 is displayed between the first display window 21 and the second display window 22, the first display window 21 is a display window above the window border 23, the second display window 22 is a display window below the window border 23, and sizes of the display windows after the screen is split are equal. In this embodiment, the screen splitting touch signal indicates screen splitting, and the screen is divided into two display windows along a default window border, but the present invention is not limited thereto. The screen splitting touch signal is further used for indicating a window border shared by any two display windows, and according to the window border indicated by the screen splitting touch signal, the current display area of the touchscreen is divided into two display windows along the window border.

In this embodiment, the original home interface is displayed in the second display window 22 by default, multiple application program icons are displayed in the home interface, and an open button and prompt information are displayed in the first display window 21, where the prompt information is used for prompting the user to drag a program icon here and open it or click the open button to select a program to be opened. By scrolling a scroll bar on the left side of the second display window 22 from top to bottom, content of the entire home interface can be displayed, and the home interface displays identifiers of all application programs, that is, the icons displayed in the figure. In other possible implementation manners, the original home interface may also be displayed in the first display window 21, and an open button and prompt information are displayed in the second display window 22, or nothing is displayed in the second display window 22. Certainly, the home interface may also be displayed in the first display window 21 and the second display window 22 at the same time, and then an application program is opened in the display window by clicking an application program icon in the home interface.

After the display area of the touchscreen is divided into two display windows, also by using the method described in Embodiment 1, sizes of the display windows may be adjusted and display windows may be exchanged, which are not described herein again.

Further, after the screen is split, a screen splitting touch signal may be entered in each display window to divide the display window into multiple display windows. For example, the user enters a screen splitting touch signal in the first display window 21 to divide the first display window 21 into two display windows, and enters a screen splitting touch signal in the second display window 22 to divide the second display window 22 into two display windows as well. Therefore, the display area of the touchscreen is divided into four display windows in total. By using this method, the touchscreen may be divided into more display windows.

S203: Obtain start signals for at least two application programs.

The start signal for an application program is a clicking touch signal for an application program in the display window; or, the start signal for an application program is a dragging touch signal for dragging an icon of an application program outside the display window into the display window. After the display window of the touchscreen is divided into at least two display windows, identifiers of application programs may be displayed in any one or more display windows, and the identifiers of the application programs are usually displayed in the form of icons.

Figure 6:
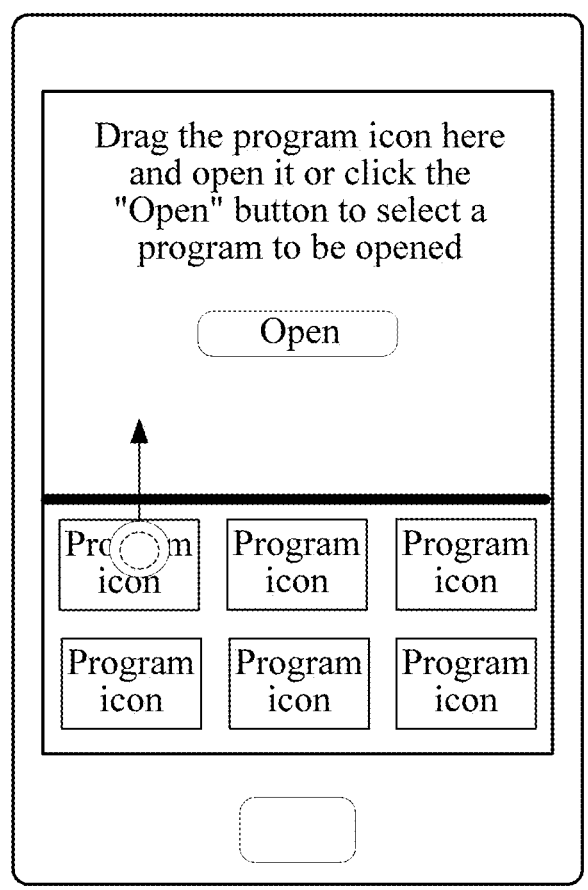
FIG. 6 is a schematic diagram of starting an application program according to an embodiment of the present invention.
Figure 7:
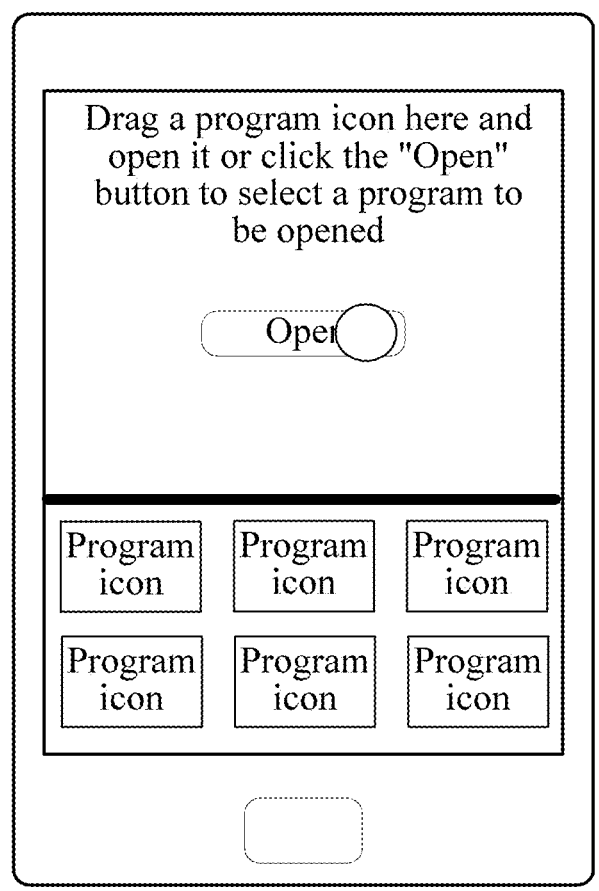
FIG. 7 is a schematic diagram of starting an application program according to an embodiment of the present invention.

As shown in FIG. 5, after the screen is split, icons of application programs are displayed in the second display window 22, and then start signals for application programs are obtained. Specifically, the start signals for at least two application programs may be obtained in the following manner:

As a feasible implementation manner, the start signal may be a dragging touch signal, and an icon of an application program outside the display window is dragged into a set area of the display window. As shown in FIG. 6, FIG. 6 is a schematic diagram of starting an application program according to an embodiment of the present invention. An icon of an application program is dragged from the window below the window border to the window above the window border. The dashed line circle encircled by the solid line circle in the figure represents a dragging operation, and by dragging the program icon to be above the window border in the figure, the corresponding application program can be opened. Alternatively, an Open button is clicked. As shown in FIG. 7, FIG. 7 is a schematic diagram of starting an application program according to an embodiment of the present invention. The solid line circle in the figure represents a clicking operation, and by clicking the Open button, icons of multiple application programs can be opened, and then an application program to be opened is selected.

As another feasible implementation manner, the start signal may be a clicking touch signal, and the user clicks an application program icon in the display window. As shown in FIG. 6, by clicking any program icon in the window below the window border, the user can open the corresponding application program in the display window.

S204: Start the at least two application programs according to the start signals, where all or a part of the started application programs are separately displayed in one display window of the display windows.

In this embodiment, if the number of the application programs for which the start signals are obtained is less than or equal to the number of the divided display windows, at least two application programs are started according to the start signals, and each started application program is separately displayed in one display window. Because the number of the application programs for which the start signals are obtained is less than or equal to the number of the divided display windows, all the application programs can be separately displayed in one display window at the same time.

If the number N of the application programs for which the start signals are obtained is greater than the number M of the divided display windows, and M and N are both positive integers, at least two application programs are started according to the start signals; each application program of first M started application programs is separately displayed in one display window, and last N-M started application programs run on the background. Because the number of the application programs that need to be started is greater than the number of the divided display windows, not all application programs can be displayed at the same time; only a part of the application programs can be displayed, and other application programs run on the background. It can be understood that M is an integer greater than 2, and N is an integer greater than M.

It can be seen that, in the split-screen display method according to this embodiment, a screen splitting touch signal entered by a user is obtained, a screen is divided into at least two display windows according to the screen splitting touch signal, at least one application program is started corresponding to each display window, and each display window displays one application program. The method according to this embodiment implements that multiple application programs are simultaneously displayed on the screen, and the user does not need to switch frequently between programs, which facilitates user operations.

Any one of the divided display windows may further display a multiple-selection mode identifier, and the user can select multiple application program identifiers by clicking the multiple-selection mode identifier, thereby implementing that multiple application programs are started simultaneously and displayed in corresponding display windows in a split-screen manner. Referring to FIG. 5, after the display area of the touchscreen is divided into two display windows, a multiple-selection mode identifier may be displayed in the display window above the window border, and in this embodiment, the multiple-selection mode identifier is displayed in the form of an open button. In addition, the display window may further display a text description of the multiple-selection mode identifier.

Figure 8:
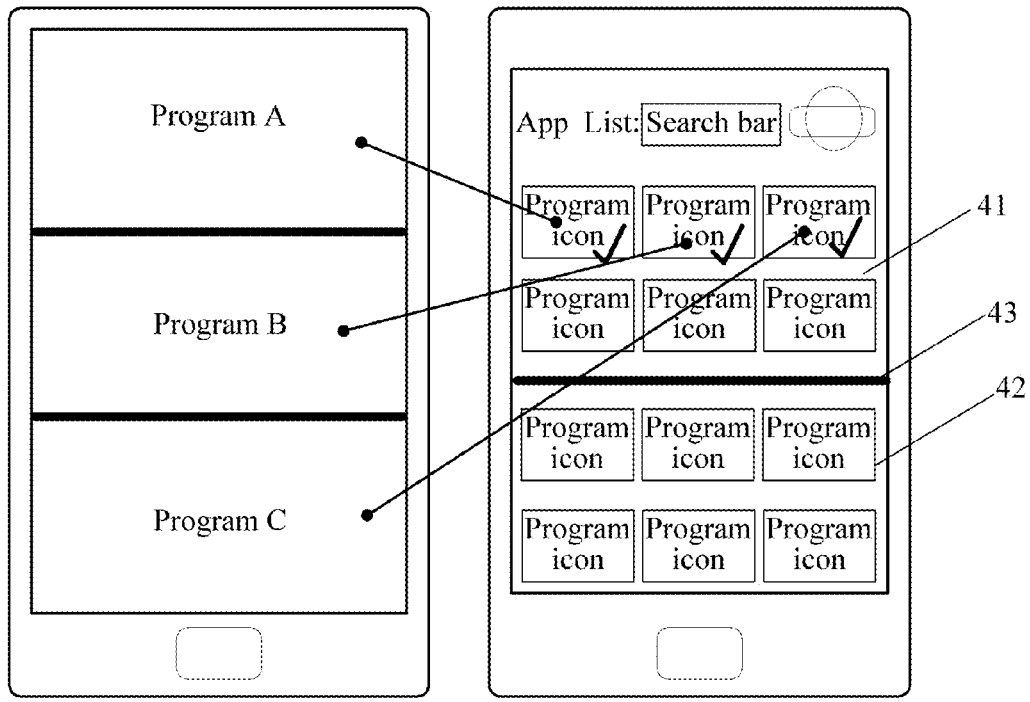
FIG. 8 is a schematic diagram of display windows in a multiple-selection mode according to an embodiment of the present invention.

In this embodiment, the user clicks the Open button, as shown in FIG. 7, to enter a multiple-selection mode. An interface after the multiple-selection mode is entered is shown in FIG. 8. FIG. 8 is a schematic diagram of display windows in a multiple-selection mode according to an embodiment of the present invention. After the Open button is clicked, icons of multiple application programs are displayed in a first display window 41 above a window border 43. In this embodiment, by scrolling a scroll bar (not shown in the figure) on the left side of the display window, icons of all application programs can be displayed. A home interface is displayed in a second display window 42 below the window border 43. An application program search bar, namely, Search bar in the figure, is further displayed in the first display window 41. By entering an option to be searched for in the search bar, the user can quickly find an application program to be opened. When the user needs to open multiple programs, the user may click icons in the figure. For example, if the user needs to open three application programs, the user first selects icons corresponding to the programs, such as the three checked program icons in FIG. 8, and then clicks a confirm button at the upper right corner (the button indicated by the black circle in the figure); in this way, three application programs can be opened at the same time. One application program is displayed in each of the display windows. As shown in FIG. 8, the display area of the touchscreen is divided into three display windows having equal sizes, and according to a sequence in which the application program icons are selected, application programs A, B, and C are displayed in order from top to bottom. A sequence of displaying application programs and whether the divided display windows are equal are not limited.

By means of the foregoing method, it can be implemented that multiple application programs are displayed in a split-screen manner, and moreover, by adding a multiple-selection mode, multiple application programs can be started at the same time and displayed in corresponding display windows in a split-screen manner, which facilitates user operations.

Figure 9:
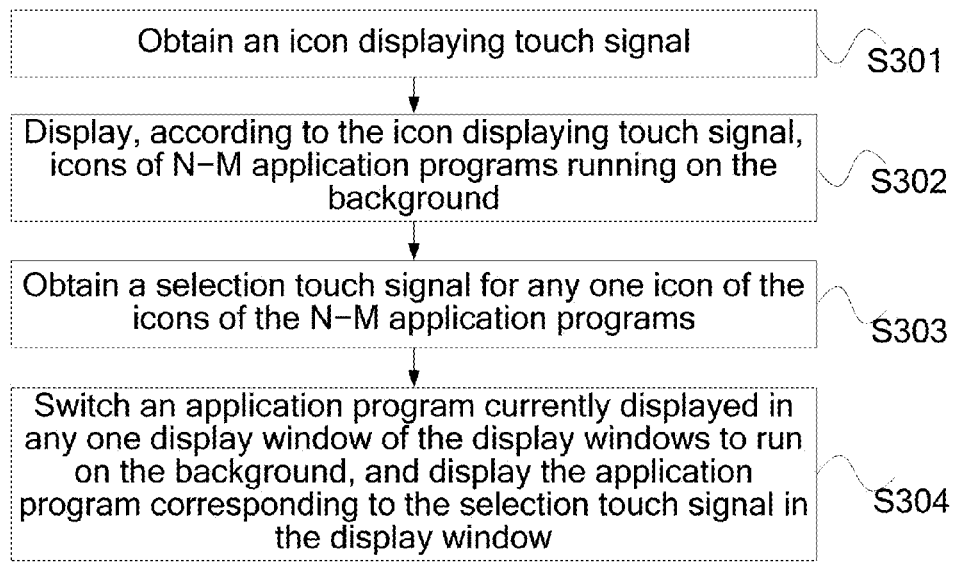
FIG. 9 is a flowchart of Embodiment 3 of a split-screen display method according to an embodiment of the present invention.

In Step 204 of Embodiment 2, when the number N of the application programs for which the start signals are obtained is greater than the number M of the divided display windows, only first M started application programs can be displayed on the screen, and last N-M started application programs run on the background. At least one application program may be started corresponding to each display window, but at a same moment, each display window can display only one application program, and other application programs may be suspended and run on the background. In each display window, by performing an operation such as switching application programs, a program running on the background can be switched to the current display window for displaying. The following specifically describes how to switch a program running on the background to the current display window for displaying by using Embodiment 3. FIG. 9 is a flowchart of Embodiment 3 of a split-screen display method according to an embodiment of the present invention. As shown in FIG. 9, the split-screen display method according to this embodiment specifically includes the following steps:

S301: Obtain an icon displaying touch signal.

The icon displaying touch signal is used for displaying an icon of an application program running on the background. The premise of this embodiment is that multiple application programs have been started on a touchscreen and displayed in a split-screen manner, and other application programs are running on the background.

Figures 10D, 10E, 10F:
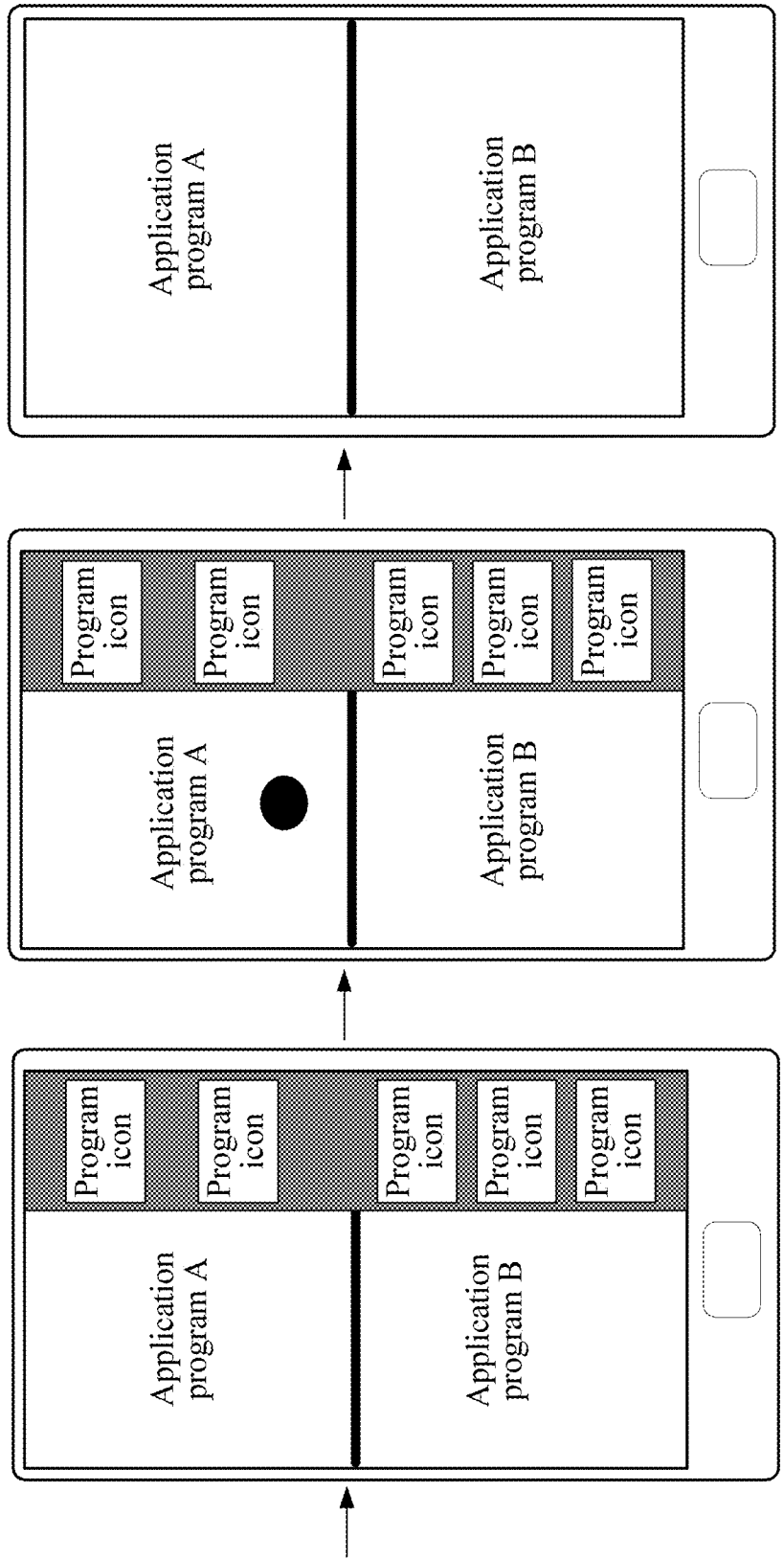

FIGS. 10A-10F are schematic diagrams of switching a background application program to a current display window according to an embodiment of the present invention. The black circle in FIG. 10A represents a sliding operation entered by a user, and a signal generated when the user slides a finger from left to right on the touchscreen is used as an icon displaying touch signal. To distinguish the icon displaying touch signal from a screen splitting touch signal, such as a horizontal-slide screen splitting touch signal, it may be set that the horizontal-slide screen splitting touch signal must be a slide from left to right and a length of a sliding track is greater than two-thirds of the screen, while the icon displaying touch signal is a slide from right to left and a sliding track is less than one-third of the screen.

It can be understood that a specific manner for generating the icon displaying touch signal is not limited herein. As an exemplary implementation manner, the icon displaying touch signal may be a signal generated when the user slides a finger leftwards from the right-most side out of the touchscreen to a one-third position of the screen. In other implementation manners, the icon displaying touch signal may be a signal generated when a finger slides from top to bottom on the touchscreen, or a signal generated when the touchscreen is clicked continually within a certain area of the touchscreen, or a signal generated when an icon display button is pressed.

S302: Display, according to the icon displaying touch signal, icons of N-M application programs running on the background.

After a switching touch signal entered by the user on the touchscreen is obtained, icons of N-M application programs running on the background are displayed, according to the switching touch signal, in a display window corresponding to the application program switching touch signal. A position where an icon of an application program is displayed is not limited, for example, the icon may be displayed at any position on the left side, right side, upper side, or lower side of the screen.

As shown in FIGS. 10A-10F, according to one sliding operation of the user from right to left, the icons of the N-M application programs running on the background are displayed in the form of a taskbar on the right side of the screen, that is, a grey area, in which icons are displayed, on the right side of each display window in the figure. It should be noted that, in FIGS. 10A-10F, icons of all application programs started corresponding to the display window, including icons of application programs running on the background and icons of application programs currently displayed in the display window, may be displayed in the taskbar.

S303: Obtain a selection touch signal for any one icon of the icons of the N-M application programs.

S304: Switch an application program currently displayed in any one display window of the display windows to run on the background, and display the application program corresponding to the selection touch signal in the display window.

The selection touch signal is a clicking touch signal for any one of the icons of the N-M application programs, or a dragging touch signal for any one of the icons of the N-M application programs. The dragging touch signal corresponds to an application program, and the dragging touch signal also corresponds to a display window, where the display window is a display window in which the application program will be displayed.

In an implementation manner, the user selects, by clicking an application program icon, an application program that needs to be displayed. As shown in FIG. 10B, two application programs are started corresponding to the display window above, and by clicking the icon of application program C, the user switches application program C to the display window above (the display window subject to switching is set by default); the black circle in the figure represents a clicking operation of the user. In another implementation manner, an icon of an application program that needs to be displayed is selected by means of dragging. As shown in FIG. 10C, by dragging an icon of an application program displayed in the taskbar on the right side into a display window in which the application program needs to be opened (it is detected that an end position of icon dragging, namely, a coordinate, is within the area of the display window), the application program is switched to the display window. In the figure, by dragging the icon of application program B to the display window below, application program B is switched to the display window below.

The method may further include:

Step 1: Obtain a hiding signal for the icons of the N-M application programs running on the background.

After one or more application programs running on the background are switched to the current display window for displaying, the hiding signal for the icons of the N-M application programs running on the background is obtained. The hiding signal is used for instructing hiding an icon of an application program, and the hiding signal may be a hiding signal generated when the user slides a finger on the touchscreen (for example, sliding from left to right), or a hiding signal generated when the touchscreen is clicked within a set area. The hiding signal and the set area are not limited. As shown in FIGS. 10A-10F, in this embodiment, the set area is an area in the display window excluding the taskbar on the right side, and after the taskbar on the right side is started, an application program displayed in the current window does not respond to any operation for the application program in the set area. At this time, any position in the set area can be clicked, and the clicking operation signal is the hiding signal; as shown in FIG. 10E, the black circle in the figure represents an operation of entering a hiding signal by a user.

Step 2: According to the hiding signal, stop displaying the icons of the N-M application programs running on the background.

For example, the hiding signal is a clicking operation signal entered by the user in the set area, and after recognizing the hiding signal, a terminal device hides the icons of the N-M application programs, which run on the background, in the display window. As shown in FIG. 10F, according to the clicking signal entered by the user in the set area, the taskbar on the right side may be hidden.

An attribute of the "taskbar" provided in the embodiment of the present invention includes a "display" value and a "hide" value, and by setting the attribute to a corresponding attribute value under the instruction of a corresponding signal, the taskbar can be displayed or hidden. Certainly, persons skilled in the art can understand that the embodiment of the present invention is not limited thereto.

This embodiment may also implement the method described in Embodiment 1, that is, adjusting sizes of display windows, exchanging application programs in display windows, and so on, which is not described herein again.

It should be noted that, the method according to this embodiment not only can switch a program running on the background to the current display window for displaying, but also can start a new application program. In specific implementation, in step 302, after the icon displaying touch signal entered by the user is obtained, if no application program is running on the background, identifiers of all application programs are displayed. By means of step 303, any one of the application programs can be started and displayed in a default or selected display window.

It can be seen that, when a user opens multiple application programs, the split-screen display method according to this embodiment can conveniently and quickly switch between multiple application programs and switch a program running on the background to the current display window for displaying, and can also start an application program conveniently and quickly.

Figure 11:
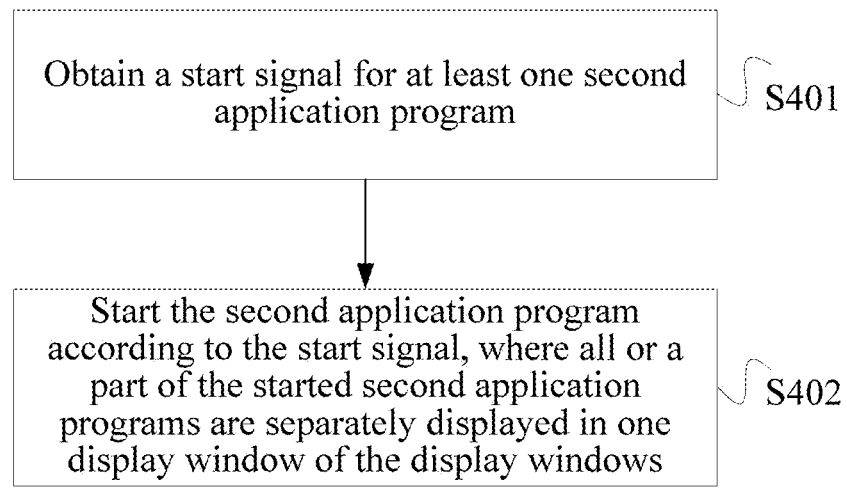
FIG. 11 is a flowchart of Embodiment 4 of a split-screen display method according to an embodiment of the present invention.

FIG. 11 is a flowchart of Embodiment 4 of a split-screen display method according to an embodiment of the present invention. This embodiment describes the split-screen display method by using an example in which a touchscreen displays a started first application program in a current display area that has not been divided into display windows, and displays the started first application program in any one display window of the divided display windows. The method according to this embodiment includes the following steps:

S401: Obtain a start signal for at least one second application program.

The start signal for a second application program is a clicking touch signal for a second application program in the display window; or, the start signal for a second application program is a dragging touch signal for dragging an icon of a second application program outside the display window into the display window. For a specific implementation manner, reference may be made to descriptions in the foregoing embodiments, which are not described herein again.

S402: Start the second application program according to the start signal, where all or a part of the started second application programs are separately displayed in one display window of the display windows.

If the number of the second application programs for which the start signals are obtained is less than the number of the divided display windows, the second application programs are started according to the start signals, and each started second application program is separately displayed in one display window of the display windows.

If the number N of the second application programs for which the start signals are obtained is greater than or equal to the number M of the divided display windows, and M and N are both positive integers, the second application programs are started according to a sequence in which the start signals are obtained; each second application program of first M−1 started second application programs is separately displayed in one display window of the display windows, and last N−M+1 started second application programs run on the background.

For a specific implementation manner of this step, reference may be made to descriptions in the foregoing embodiments, which are not described herein again.

In this embodiment, when there is an application program running on the background, the application program running on the background may be switched to the current display window in the following manner: in a first step, an icon displaying touch signal is obtained, where the icon displaying touch signal is used for displaying an icon of an application program running on the background; in a second step, icons of the N-M+1 second application programs running on the background are displayed according to the icon displaying touch signal; in a third step, a selection touch signal for any one icon of the icons of the N-M+1 second application programs is obtained; and in a fourth step, an application program currently displayed in any one display window of the display windows is switched to run on the background, and the second application program corresponding to the selection touch signal is switched to the display window for displaying. For a specific implementation manner, reference may be made to descriptions in the foregoing embodiments, which are not described herein again.

Figure 12:
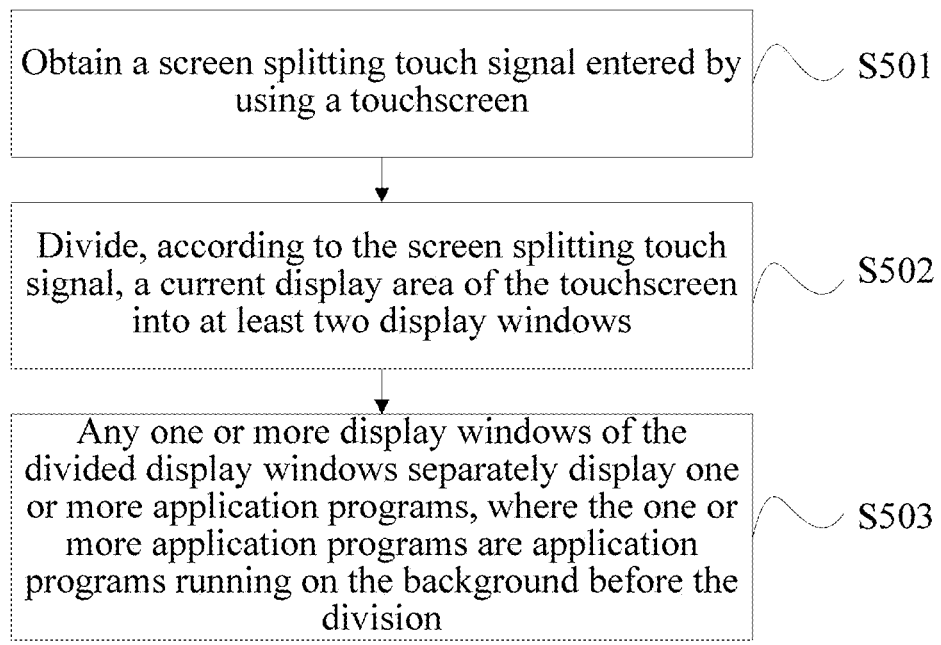
FIG. 12 is a flowchart of Embodiment 5 of a split-screen display method according to an embodiment of the present invention.

In Embodiment 3 and Embodiment 4, when multiple application programs run on the background, the user needs to enter a certain instruction signal to switch an application program running on the background to the current display window. In Embodiment 5 of the present invention, multiple programs running on the background may be displayed in an automatic selection manner, and the user does not need to enter an instruction signal. The premise of Embodiment 5 is that, multiple application programs run on the background before a screen is split. FIG. 12 is a flowchart of Embodiment 5 of a split-screen display method according to an embodiment of the present invention. The method according to this embodiment includes:

S501: Obtain a screen splitting touch signal entered by using a touchscreen.

S502: Divide, according to the screen splitting touch signal, a current display area of the touchscreen into at least two display windows.

In this embodiment, implementation manners of steps 501 and 502 are similar to the implementation manners of steps 101 and 102 in Embodiment 1, and therefore are not described herein again.

S503: Any one or more display windows of the divided display windows separately display one or more application programs, where the one or more application programs are application programs running on the background before the division.

In this embodiment, the touchscreen does not display any started application program in the current display area that has not been divided into display windows; or, the touchscreen displays a started first application program in the current display area that has not been divided into display windows, where any one of the divided display windows displays the first application program.

The premise of this embodiment is that, multiple application programs run on the background before the screen is split, and after the touchscreen is divided into multiple display windows, any one or more of the divided display windows separately display one or more application programs. The one or more application programs are selected in descending order of frequencies at which the application programs are used by a user; or, the one or more application programs are selected according to use time of the application programs, from the latest to the earliest.

To be specific, when the number of the divided display windows is less than the number of the application programs running on the background, according to the descending order of the frequencies at which the user uses the application programs, an application program frequently used by the user is selected in priority for displaying, and an application program used less frequently still runs on the background. Certainly, also according to the use time of the application programs, from the latest to the earliest, an application program with later use time may be selected in priority for displaying. For example, there are four application programs running on the background, which are QQ (an application for instant messaging), WeChat (another application used for instant messaging, which is similar to QQ), a game, and Thunder (an application used for downloading). The touchscreen is only divided into two display windows, while QQ is a program with the latest use time, and the game is a program with the second latest use time. Therefore, QQ and the game are separately displayed in a display window, and WeChat and Thunder still run on the background.

It can be seen that, in the method according to this embodiment, multiple application programs, which run on the background before the screen is split, are automatically displayed in any one or more of the divided display windows in a default manner after the screen is split, which facilitates user operations and brings better experience for users. In Embodiment 1 to Embodiment 5, the touchscreen is divided into multiple display windows by using the screen splitting touch signal. Certainly, the user may also end the screen splitting when choosing to exit a split-screen mode as required, which is described specifically in the following. First, a split-screen closing touch signal entered by using the touchscreen is obtained, where the split-screen closing touch signal is used for instructing the electronic device to close the split screen. The split-screen closing touch signal may be a slide signal along a window border of any two display windows, for example, a signal generated when a user slides a finger rightwards from the left-most side of the window border of the two display windows to the right-most side of the screen is the closing touch signal. Then, at least two display windows of the touchscreen are combined into one display area according to the split-screen closing touch signal, where the display area displays display content of any one of the display windows or displays any combination of content displayed in the display windows. Specifically, the two display windows corresponding to the window border are combined into one display window according to the slide signal along the window border of any two display windows.

Figure 13:
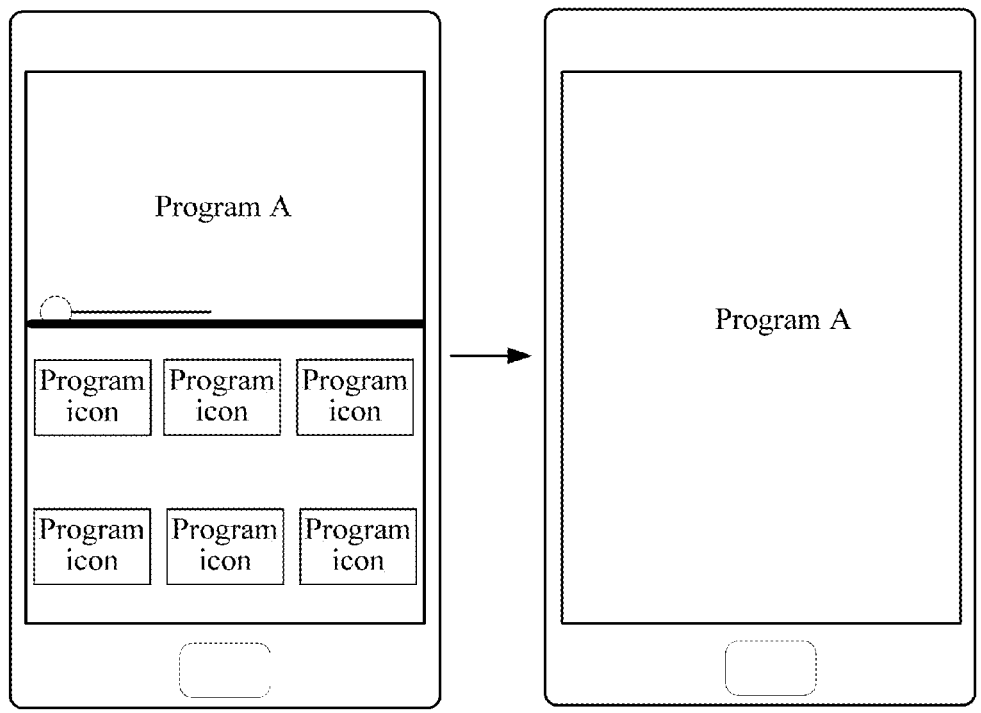
FIG. 13 is a schematic diagram of a split-screen closing operation according to an embodiment of the present invention.

As shown in FIG. 13, FIG. 13 is a schematic diagram of a split-screen closing operation according to an embodiment of the present invention. Application program A is displayed in a first display window, and multiple application program icons are displayed in a second display window. A slide starts from the left side of the window border and goes rightwards to the right-most side of the screen; the second display window is closed, the first display window occupies the position of the second display window, and the entire screen displays application program A. In this method, by default, the display window below the window border is closed, and the program in the display window above the window border is displayed. By means of the foregoing operation, any display window can be closed.

Figure 14:
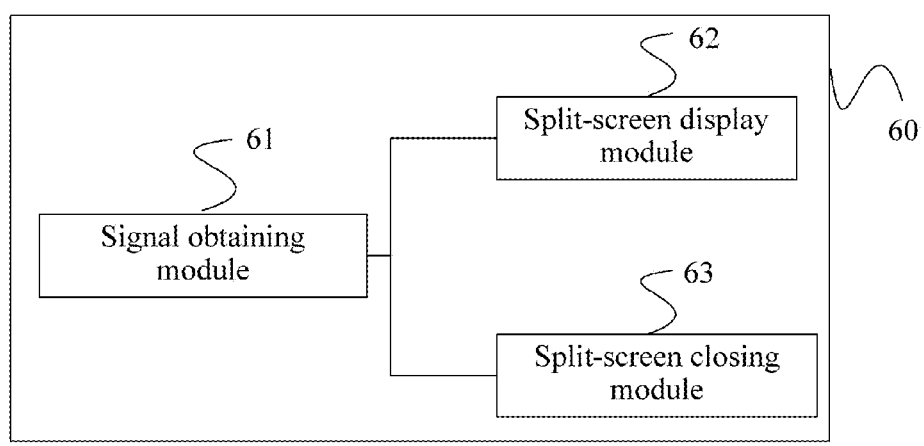
FIG. 14 is a schematic structural diagram of Embodiment 6 of a split-screen display apparatus according to an embodiment of the present invention.

FIG. 14 is a schematic structural diagram of Embodiment 6 of a split-screen display apparatus according to an embodiment of the present invention. The apparatus 60 can be applied to an electronic device having a touchscreen, and the apparatus includes a signal obtaining module 61 and a split-screen display module 62. The signal obtaining module 61 is configured to obtain a screen splitting touch signal entered by using the touchscreen, and the split-screen display module 62 is configured to divide, according to the screen splitting touch signal obtained by the signal obtaining module 61, a current display area of the touchscreen into at least two display windows.

In an implementation manner, the screen splitting touch signal may be a horizontal slide signal along the touchscreen, and the split-screen display module 62 divides, according to the horizontal slide signal, the current display area of the touchscreen into at least two display windows arranged up and down. In another implementation manner, the screen splitting touch signal may be a vertical slide signal along the touchscreen, and the split-screen display module 62 divides, according to the vertical slide signal, the current display area of the touchscreen into at least two display windows arranged side by side.

A window border between multiple display windows after the screen is split may be set by default, and may also be obtained according to the screen splitting touch signal. Specifically, the horizontal slide signal may be used for indicating a window border shared by any two display windows divided up and down on the touchscreen, and the split-screen display module 62 may divide, according to the window border indicated by the horizontal slide signal, the current display area of the touchscreen into at least two display windows with the window border as a shared border and arranged up and down. Alternatively, the vertical slide signal may be used for indicating a window border shared by any two display windows divided side by side on the touchscreen, and the split-screen display module 62 may divide, according to the window border indicated by the vertical slide signal, the current display area of the touchscreen into at least two display windows with the window border as a shared border and arranged side by side.

It should be noted that, in the embodiment of the present invention, an included angle between a sliding track formed by a sliding start position and a sliding end position of the horizontal slide signal and a horizontal direction of the touchscreen is less than or equal to a first threshold; and an included angle between a sliding track formed by a sliding start position and a sliding end position of the vertical slide signal and a vertical direction of the touchscreen is less than or equal to a second threshold. The first threshold and the second threshold may be set by persons skilled in the art, which generally do not exceed 45°.

In this embodiment, each of the divided display windows may separately display a part of display content of the current display area; or any one of the divided display windows displays all display content of the current display area, and other display windows may not display the display content of the current display area; or, each of the divided display windows displays all display content of the current display area.

If the touchscreen does not display any started application program in the current display area that has not been divided into display windows, each of the divided display windows may not display any application program either; or, if the touchscreen displays a started first application program in the current display area that has not been divided into display windows, any one display window of the divided display windows displays the first application program.

If multiple application programs run on the background before division, any one or more display windows of the divided display windows may separately display one or more application programs, where the one or more application programs are the application programs running on the background before the division. The one or more application programs may be selected in descending order of frequencies at which the application programs are used by a user, or may also be selected according to use time of the application programs, from the latest to the earliest. This manner can implement that a program running on the background is automatically switched to the display window, which facilitates user operations.

The apparatus according to this embodiment further includes a split-screen closing module 63, where the signal obtaining module 61 is further configured to obtain a split-screen closing touch signal entered by using the touchscreen. The split-screen closing module 63 is configured to combine at least two display windows of the touchscreen into one display area according to the split-screen closing touch signal, where the display area displays display content of any one of the display windows or displays any combination of content displayed in the display windows.

The split-screen closing touch signal may be a slide signal along a window border of any two display windows, and then, the split-screen closing module 63 is specifically configured to combine, according to the slide signal along a window border of any two display windows, the two display windows corresponding to the window border into one display window. By entering a split-screen closing touch signal, the user can exit the split-screen mode conveniently.

The apparatus according to this embodiment obtains a screen splitting touch signal of a user, and divides a touchscreen into at least two display windows according to the screen splitting touch signal, so that each display window can display one application program. Therefore, it is implemented that multiple application programs are displayed on the screen, and the user does not need to switch frequently between programs, which facilitates user operations.

Figure 15:
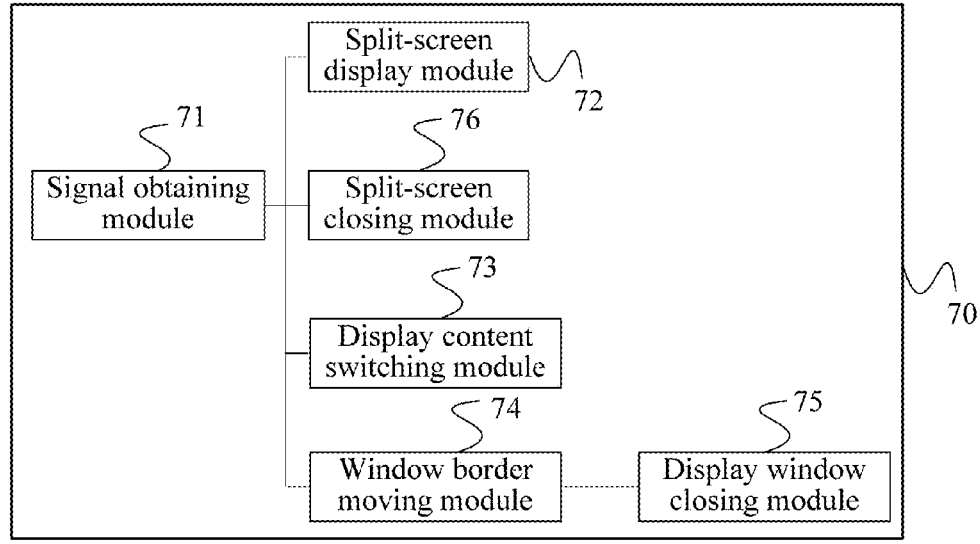
FIG. 15 is a schematic structural diagram of Embodiment 7 of a split-screen display apparatus according to an embodiment of the present invention.

FIG. 15 is a schematic structural diagram of Embodiment 7 of a split-screen display apparatus according to an embodiment of the present invention. Based on Embodiment 6, this embodiment includes a display content switching module, a window border moving module, and a display window closing module, which are used for implementing switching of display content between adjacent display windows and adjustment of sizes of display windows. As shown in FIG. 15, a split-screen display apparatus 70 according to this embodiment includes: a signal obtaining module 71, a split-screen display module 72, a display content switching module 73, a window border moving module 74, a display window closing module 75, and a split-screen closing module 76.

Functions of the signal obtaining module 71, the split-screen display module 72, and the split-screen closing module 76 are the same as those in Embodiment 6. The signal obtaining module 71 is configured to obtain a screen splitting touch signal entered by using the touchscreen; the split-screen display module is configured to divide, according to the screen splitting touch signal obtained by the signal obtaining module 71, a current display area of the touchscreen into at least two display windows. The split-screen closing module 76 is configured to combine at least two display windows of the touchscreen into one display area according to a split-screen closing touch signal, where the display area displays display content of any one of the display windows or displays any combination of content displayed in the display windows. For a specific implementation manner, reference may be made to descriptions in Embodiment 6, which is not described herein again.

In this embodiment, the signal obtaining module 71 is further configured to obtain a sliding touch signal from a first display window to a second display window or a sliding touch signal from the second display window to the first display window. The sliding touch signal is entered by the user by using the touchscreen. The user slides a finger from the first display window to the second display window, or the user slides a finger from the second display window to the first display window, or the user simultaneously slides two fingers separately from one display window to the other display window, and all the foregoing three manners can implement switching of display content of the two adjacent display windows.

The display content switching module 73 is configured to, according to the sliding touch signal obtained by the signal obtaining module 71, switch display content in the first display window to the second display window for displaying, and switch display content in the second display window to the first display window for displaying. Switching of display content of adjacent display windows can be implemented.

The signal obtaining module 71 is further configured to obtain a dragging touch signal for a window border. The dragging touch signal indicates a position to which the window border is dragged.

The window border moving module 74 is configured to shift a position of the window border according to the dragging touch signal obtained by the signal obtaining module 71 for the window border.

The display window closing module 75 is configured to determine, according to the position of the window border shifted by the window border moving module 74, whether any one display window of the two display windows that share the window border is less than a set size; and if it is determined that the any one display window is less than the set size, close the display window that is less than the set size, and allocate a display area of the closed display window to the other display window that shares the window border with the closed display window.

The apparatus according to this embodiment not only can implement displaying of multiple application programs on the screen at the same time, but also can conveniently implement flexible switching of display content of display windows, and in addition, can adjust sizes of the display windows according to a requirement of the user, thereby bringing better experience for the user.

Figure 16:
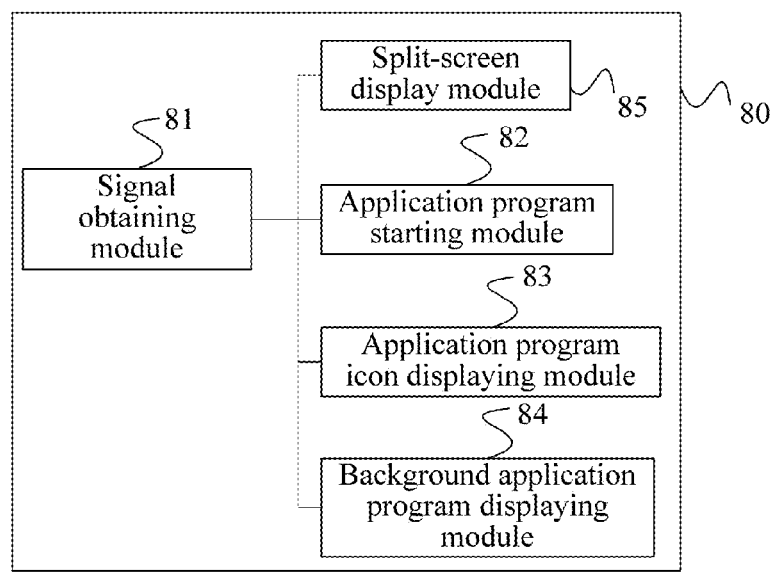
FIG. 16 is a schematic structural diagram of Embodiment 8 of a split-screen display apparatus according to an embodiment of the present invention.

FIG. 16 is a schematic structural diagram of Embodiment 8 of a split-screen display apparatus according to an embodiment of the present invention. In this embodiment, a touchscreen does not display any started application program in a current display area that has not been divided into display windows; as shown in FIG. 16, a split-screen display apparatus 80 according to this embodiment includes: a signal obtaining module 81, an application program starting module 82, an application program icon displaying module 83, a background application program displaying module 84, and a split-screen display module 85. The split-screen display module 85 is configured to divide, according to a screen splitting touch signal obtained by the signal obtaining module, a current display area of the touchscreen into at least two display windows.

First, the signal obtaining module 81 obtains a screen splitting touch signal entered by using the touchscreen, and then the split-screen display module 85 divides, according to the screen splitting touch signal obtained by the signal obtaining module 81, the current display area of the touchscreen into at least two display windows. For a specific implementation manner, reference may be made to descriptions in Embodiment 6, which is not described herein again.

When the touchscreen does not display any started application program in the current display area that has not been divided into display windows, the signal obtaining module 81 is further configured to obtain start signals for at least two application programs. The start signal for an application program is a clicking touch signal for an application program in the display window; or, the start signal for an application program is a dragging touch signal for dragging an icon of an application program outside the display window into the display window.

The application program starting module 82 is configured to start the at least two application programs according to the start signals, where all or a part of the started application programs are separately displayed in one display window of the display windows.

If the number of the application programs, for which the signal obtaining module 81 obtains the start signals, is less than or equal to the number of the divided display windows, the application program starting module 82 is specifically configured to start at least two application programs according to the start signals, where each started application program is separately displayed in one display window of the display windows.

If the number N of the application programs, for which the signal obtaining module 81 obtains the start signals, is greater than the number M of the divided display windows, and M and N are both positive integers, the application program starting module 82 is specifically configured to start the application programs according to a sequence in which the start signals are obtained, where each application program of first M started application programs is separately displayed in one display window of the display windows, and last N-M started application programs run on the background.

The signal obtaining module 81 is further configured to obtain an icon displaying touch signal. The icon displaying touch signal is used for displaying an icon of an application program, and the application program may include an application program running on the background. The application program icon displaying module 83 is configured to display, according to the icon displaying touch signal, icons of the N-M application programs running on the background.

The signal obtaining module 81 is further configured to obtain a selection touch signal for any one icon of the icons of the N-M application programs. The background application program displaying module 84 is configured to switch an application program currently displayed in any one display window of the display windows to run on the background, and display the second application program corresponding to the selection touch signal in the display window. The selection touch signal for any one icon of the icons of the N-M application programs may be a clicking touch signal for any one icon of the icons of the N-M application programs, or a dragging touch signal for any one icon of the icons of the N-M application programs.

The signal obtaining module 81 is further configured to obtain a hiding signal for the icons of the N-M application programs running on the background, and the background application program displaying module 84 is configured to: according to the hiding signal, stop displaying the icons of the N-M application programs running on the background.

In this embodiment, when the touchscreen displays a started first application program in the current display area that has not been divided into display windows, and displays the started first application program displayed in any one display window of the divided display windows, the signal obtaining module 81 is further configured to obtain a start signal for at least one second application program. The start signal for a second application program is a clicking touch signal for a second application program in the display window; or, the start signal for a second application program is a dragging touch signal for dragging an icon of a second application program outside the display window into the display window.

The application program starting module 82 is further configured to start the second application program according to the start signal, where all or a part of the started second application programs are separately displayed in one display window of the display windows.

If the number of the second application programs, for which the signal obtaining module 81 obtains the start signals, is less than the number of the divided display windows, the application program starting module 82 is specifically configured to start the second application program according to the start signal, where each started second application program is separately displayed in one display window of the display windows.

If the number N of the second application programs, for which the signal obtaining module 81 obtains the start signals, is greater than or equal to the number M of the divided display windows, and M and N are both positive integers, the application program starting module 82 is specifically configured to start the second application programs according to a sequence in which the start signals are obtained, where each second application program of first M−1 started second application programs is separately displayed in one display window of the display windows, and last N-M+1 started second application programs run on the background.

When the user needs to switch an application program running on the background to the current display window, the signal obtaining module 81 is further configured to obtain an icon displaying touch signal. The application program icon displaying module 83 is configured to display, according to the icon displaying touch signal, icons of the N-M+1 second application programs running on the background. The signal obtaining module 81 is further configured to obtain a selection touch signal for any one icon of the icons of the N-M+1 second application programs; the background application program displaying module 84 is configured to switch an application program currently displayed in any one display window of the display windows to run on the background, and display the second application program corresponding to the selection touch signal in the display window. It can be seen that, in the split-screen display apparatus according to this embodiment, a screen splitting touch signal entered by a user is obtained, a screen is divided into at least two display windows according to the screen splitting touch signal, at least one application program is started corresponding to each display window, and each display window displays one application program. It is implemented that multiple application programs can be displayed on the screen at the same time, and an application program running on the background can be conveniently switched to the current window for displaying, which facilitates user operations; the user does not need to switch frequently between programs, which brings better experience for the user.

Figure 17:
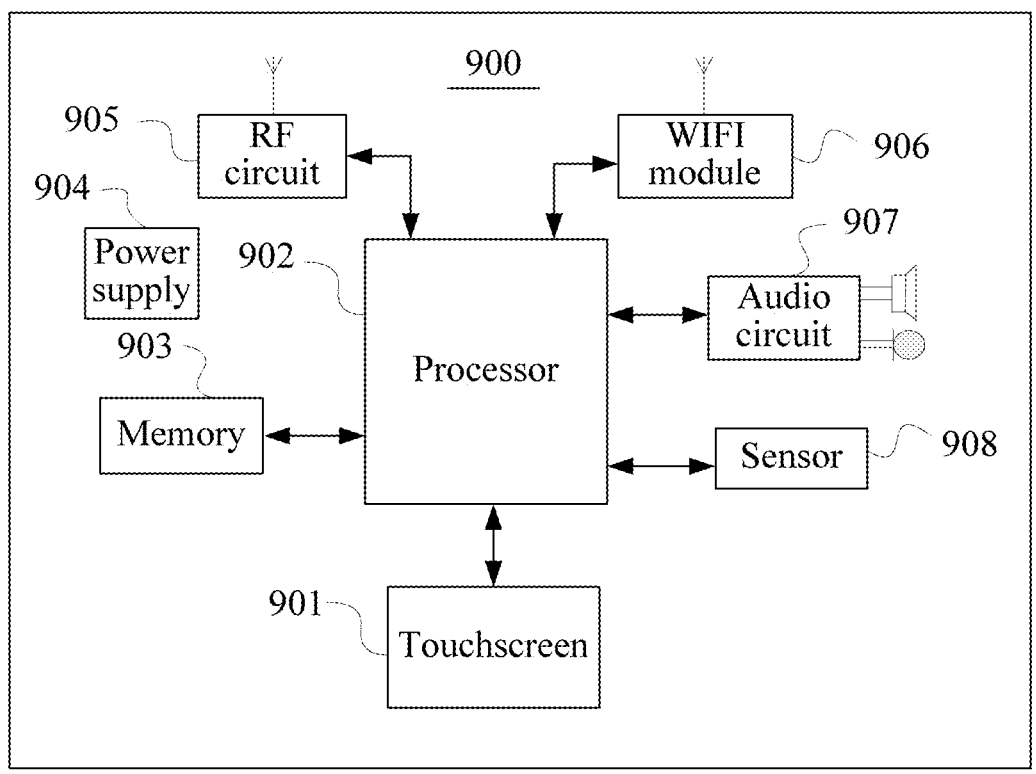
FIG. 17 is a schematic structural diagram of an electronic device according to Embodiment 9 of the present invention.

FIG. 17 is a schematic structural diagram of an electronic device according to Embodiment 9 of the present invention. As shown in FIG. 17, the terminal according to this embodiment can be used for implementing the methods of Embodiment 1 to Embodiment 5 of the present invention. For ease of description, only parts related to the embodiment of the present invention are shown. For undisclosed specific technical details, please refer to descriptions of the methods of Embodiments 1 to 5 of the present invention. The electronic device may be a device having a touchscreen, such as a mobile phone, a tablet computer, a PDA, a Point of Sales (POS), and a vehicle-mounted computer.

In this embodiment, only parts related to operations of a split-screen display method are described. Specifically, a memory 903 may be configured to store software programs and modules, and a processor 902 implements, by running the software programs and modules stored in the memory 903, the split-screen display method according to the embodiment of the present invention.

This embodiment uses an example in which the electronic device is a mobile phone. FIG. 17 shows a block diagram of a partial structure of a mobile phone 900 according to an embodiment of the present invention. Referring to FIG. 17, the mobile phone 900 specifically includes: a touchscreen 901, a processor 902, a memory 903, a power supply 904, an Radio Frequency (RF) circuit 905, a wireless fidelity (WiFi) module 906, an audio circuit 907, a sensor 908, and other parts. Persons skilled in the art can understand that, the mobile phone structure shown in FIG. 17 does not constitute any limitation on the mobile phone, and the mobile phone may include more or less parts than those shown in the figure, or have some parts combined, or have a different part layout. The mobile phone 900 may further include a camera, a Bluetooth module, and so on, which though are not shown, and details are not described herein again.

The touchscreen 901 may be configured to receive a screen splitting touch signal, and digital or character information that are entered by a user, and generate key signal input related to user settings and function control of the mobile phone 900. The touchscreen 901 may obtain a touching operation performed on it by a user (an operation performed by the user on the touchscreen with any appropriate object or accessory, such as a finger or stylus), and drive a corresponding connected apparatus according to a preset program. The touchscreen 901 sends the obtained touch signal and other signals to the processor 902, and can receive a command sent by the processor 902 and execute the command. In this embodiment, the touchscreen 901 not only has an input function, but also has a display function, and can display a corresponding result to a user according to a processing result of the processor.

The processor 902 is a control center of the mobile phone, and uses various interfaces and circuits to connect parts of the entire mobile phone. By running or executing the software programs and/or modules stored in the memory 903, and by invoking data stored in the memory 903, the processor 902 executes various functions of the mobile phone 900 and processes data. Preferably, the processor 902 can integrate an application processor and a modem processor, where the application processor mainly processes an operating system, a user interface, an application program, and so on, and the modem processor mainly processes wireless communication. It can be understood that, the foregoing modem processor may not be integrated into the processor 902.

In this embodiment, the touchscreen 901 and the processor 902 specifically have the following functions:

The touchscreen 901 is configured to obtain a screen splitting touch signal input by the touchscreen 901, and send the screen splitting touch signal to the processor 902. The screen splitting touch signal includes a horizontal slide signal along the touchscreen or a vertical slide signal along the touchscreen.

The processor 902 is configured to divide, according to the horizontal slide signal, a current display area of the touchscreen into at least two display windows arranged up and down; or, divide, according to the vertical slide signal, a current display area of the touchscreen into at least two display windows arranged side by side. When the screen splitting touch signal indicates screen splitting, the processor 902 may further be configured to divide the current display area of the touchscreen 901 into at least two display windows according to the screen splitting touch signal and along a default window border.

When the screen splitting touch signal indicates a window border shared by any two display windows, the processor 902 is specifically configured to divide the current display area of the touchscreen 901 into at least two display windows according to the window border indicated by the screen splitting touch signal and along the window border.

In an implementation manner, the horizontal slide signal indicates a window border shared by any two display windows divided up and down on the touchscreen. The processor is specifically configured to divide, according to the window border indicated by the horizontal slide signal, the current display area of the touchscreen into at least two display windows with the window border as a shared border and arranged up and down.

In another implementation manner, the vertical slide signal indicates a window border shared by any two display windows divided side by side on the touchscreen. The processor is specifically configured to divide, according to the window border indicated by the vertical slide signal, the current display area of the touchscreen into at least two display windows with the window border as a shared border and arranged side by side. An included angle between a sliding track formed by a sliding start position and a sliding end position of the horizontal slide signal and a horizontal direction of the touchscreen is less than or equal to a first threshold; and an included angle between a sliding track formed by a sliding start position and a sliding end position of the vertical slide signal and a vertical direction of the touchscreen is less than or equal to a second threshold. Values of the first threshold and the second threshold may be set to be less than or equal to 45°.

In this embodiment, each divided display window separately displays a part of display content of the current display area; or any one of the divided display windows displays all display content of the current display area, and other display windows may not display the display content of the current display area; or, each of the divided display windows displays all display content of the current display area.

In this embodiment, the touchscreen 901 is further configured to obtain a sliding touch signal from a first display window to a second display window or a sliding touch signal from the second display window to the first display window, and send the sliding touch signal to the processor 902. The processor 902 is configured to: according to the sliding touch signal, switch display content in the first display window to the second display window for displaying, and switch display content in the second display window to the first display window for displaying. The sliding touch signal indicates switching of content between two or more display windows.

The touchscreen 901 is further configured to obtain a dragging touch signal for a window border, and send the dragging touch signal to the processor 902. The processor 902 is configured to: shift a position of the window border according to the dragging touch signal for the window border; determine, according to the shifted position of the window border, whether any one display window of the two display windows that share the window border is less than a set size; and if it is determined that the any one display window is less than the set size, close the display window that is less than the set size, and allocate a display area of the closed display window to the other display window that shares the window border with the closed display window.

According to the description of the foregoing method embodiment, under the control of the processor 902, the position of a window border control is changed, and the change of the position of the widow border control triggers a change of an attribute (which includes, but is not limited to, a size) of the display window, thereby affecting the size of the display window.

If the touchscreen 901 does not display any started application program in the current display area that has not been divided into display windows, the touchscreen 901 is further configured to obtain start signals for at least two application programs, and send the start signals to the processor 902. The start signal for an application program is a clicking touch signal for an application program in the display window, or a dragging touch signal for dragging an icon of an application program outside the display window into the display window. The processor 902 is configured to start the at least two application programs according to the start signals, where all or a part of the started application programs are separately displayed in one display window of the display windows.

If the number of the application programs, for which the touchscreen 901 obtains the start signals, is less than or equal to the number of the divided display windows, the processor 902 is specifically configured to start the at least two application programs according to the start signals, where each started application program is separately displayed in one display window of the display windows. If the number N of the application programs, for which the touchscreen 901 obtains the start signals, is greater than the number M of the divided display windows, and M and N are both positive integers, the processor 902 is specifically configured to start the application programs according to a sequence in which the start signals are obtained, where each application program of first M started application programs is separately displayed in one display window of the display windows, and last N-M started application programs run on the background.

The touchscreen 901 is further configured to obtain an icon displaying touch signal, and send the icon displaying touch signal to the processor 902. The processor 902 is further configured to display, according to the icon displaying touch signal, icons of the N-M application programs running on the background. The touchscreen 901 is further configured to obtain a selection touch signal for any one icon of the icons of the N-M application programs, and send the selection touch signal to the processor 902. The processor 902 is further configured to switch an application program currently displayed in any one display window of the display windows to run on the background, and display the application program corresponding to the selection touch signal in the display window.

The selection touch signal obtained by the touchscreen 901 for any one icon of the icons of the N-M application programs is a clicking touch signal for any one icon of the icons of the N-M application programs; or, the selection touch signal for any one icon of the icons of the N-M application programs is a dragging touch signal for any one icon of the icons of the N-M application programs.

The touchscreen 901 is further configured to obtain a hiding signal for the icons of the N-M application programs running on the background, where the hiding signal is used for instructing hiding the icons of the N-M application programs running on the background; and send the hiding signal to the processor 902. The processor 902 is further configured to: according to the hiding signal, stop displaying the icons of the N-M application programs running on the background.

When the touchscreen 901 displays a started first application program in the current display area that has not been divided into display windows, the started first application program is displayed in any one of the divided display windows. The touchscreen 901 is further configured to obtain a start signal for at least one second application program, and send the start signal to the processor 902. The start signal for a second application program is a clicking touch signal for a second application program in the display window; or, the start signal for a second application program is a dragging touch signal for dragging an icon of a second application program outside the display window into the display window.

The processor 902 is further configured to start the second application program according to the start signal, where all or a part of the started second application programs are separately displayed in one display window of the display windows.

If the number of the second application programs, for which the touchscreen 901 obtains the start signals, is less than the number of the divided display windows, the processor 902 is specifically configured to start the second application program according to the start signal, where each started second application program is separately displayed in one display window of the display windows.

If the number N of the second application programs, for which the touchscreen 901 obtains the start signals, is greater than or equal to the number M of the divided display windows, and M and N are both positive integers, the processor 902 is specifically configured to start the second application programs according to a sequence in which the start signals are obtained, where each second application program of first M−1 started second application programs is separately displayed in one display window of the display windows, and last N−M+1 started second application programs run on the background.

In this embodiment, an application program running on the background and an application program currently displayed in the display window can be switched with each other. The touchscreen 901 first obtains an icon displaying touch signal, and sends the icon displaying touch signal to the processor. After that, the processor 902 displays, according to the icon displaying touch signal, the icons of the N−M+1 second application programs running on the background. Then, the touchscreen 901 obtains a selection touch signal for any one icon of the icons of the N−M+1 second application programs. Finally, the processor 902 switches an application program currently displayed in any one display window of the display windows to run on the background, and displays the second application program corresponding to the selection touch signal in the display window.

In this embodiment, any one or more display windows of the divided display windows separately display one or more application programs, where the one or more application programs are application programs running on the background before the division. The one or more application programs are selected in descending order of frequencies at which the application programs are used by a user; or, the one or more application programs are selected according to use time of the application programs, from the latest to the earliest.

The touchscreen 901 does not display any started application program in the current display area that has not been divided into display windows; or, the touchscreen 901 displays a started first application program in the current display area that has not been divided into display windows, where any one of the divided display windows displays the first application program.

The touchscreen 901 is configured to obtain a split-screen closing touch signal entered by using the touchscreen 901, and send the split-screen closing touch signal to the processor 902; the processor 902 is configured to combine, according to the split-screen closing touch signal, at least two display windows of the touchscreen 901 into one display area, where the display area displays display content of any one of the display windows or any combination of content displayed in the display windows.

The split-screen closing touch signal may be a slide signal along a window border of any two display windows; the processor 902 is specifically configured to combine, according to the slide signal along a window border of any two display windows, the two display windows corresponding to the window border into one display window.

It should be noted that, the electronic device according to this embodiment can be used for executing the method described in any one of the embodiments of the present invention.

It can be seen that, in the split-screen display method, apparatus, and electronic device according to the embodiments of the present invention, a horizontal slide signal along the touchscreen or a vertical slide signal along the touchscreen entered by using the touchscreen is obtained; a current display area of the touchscreen is divided into at least two display windows arranged up and down according to the horizontal slide signal, or a current display area of the touchscreen is divided into at least two display windows arranged side by side according to the vertical slide signal, thereby implementing that multiple application programs are simultaneously displayed on the screen up and down or side by side, and a user does not need to switch frequently between programs, which facilitates user operations.

The embodiment of the present invention further provides a method for switching display content of the display windows, a method for switching a background application program with display content currently displayed in the display window, a method for dragging a display window border, and the like, and an apparatus and an electronic device for implementing these methods, which further facilitate operations of the user in a multi-display window mode, improve operation efficiency of the user, and improve user experience.

The embodiments in this specification are described in a progressive manner, for same or similar parts in the embodiments, reference may be made to each other, and each embodiment focuses on a difference between the embodiment and other embodiments. Especially, the apparatus embodiments are basically similar to the method embodiments, and therefore are described briefly; for related parts, reference may be made to partial descriptions in the method embodiments. The described apparatus embodiment is merely exemplary. The units described as separate parts may or may not be physically separate, and parts displayed as units may or may not be physical units, may be located in one position, or may be distributed on a plurality of network units. A part or all of the modules may be selected according to actual needs to achieve the objectives of the solutions of the embodiments. Persons of ordinary skill in the art can understand and implement the present invention without creative efforts.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. A part or all of the units may be selected according to actual needs to achieve the objectives of the solutions of the embodiments. Functional units in the embodiments of the present invention may be integrated into one processing unit, or each of the units may exist alone physically, or two or more units are integrated into one unit. In the accompanying drawings for the apparatus embodiment provided by the present invention, a connection relationship between modules represents that they have a communication connection, which may be specifically implemented as one or more communication buses or signal lines. Persons of ordinary skill in the art can understand and implement the present invention without creative efforts. Using the above descriptions of the implementation manners, persons skilled in the art can clearly learn that the present invention may be implemented by means of software plus mandatory universal hardware, and certainly may also be implemented by means of dedicated hardware including an application-specific integrated circuit, a dedicated CPU, a dedicated memory, a dedicated component, and so on. In general cases, any function completed by a computer program can be easily implemented by using corresponding hardware, and moreover, various specific hardware structures, such as an analog circuit, a digital circuit, or a dedicated circuit, may be used for implementing a same function. However, for the present invention, implementation by means of software programs is a better implementation manner in more cases. Based on such an understanding, the technical solutions of the present invention essentially or the part contributing to the prior art may be implemented in a form of a software product. The software product is stored in a readable storage medium, such as a floppy disk, a universal serial bus (USB) flash drive, a removable hard disk, a read-only memory (ROM), a random access memory (RAM), a magnetic disk, or an optical disc of a computer, and includes several instructions for instructing a computer device (which may be a personal computer, a server, or a network device) to perform the methods described in the embodiments of the present invention.

Finally, it should be noted that the foregoing embodiments are merely intended for describing the technical solutions of the present invention but not for limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. A split-screen display method, wherein the method is applied to an electronic device having a touchscreen, the method comprising:
   receiving a screen splitting touch signal from the touchscreen, wherein the screen splitting touch signal comprises a horizontal slide signal along the touchscreen;
   dividing, according to the horizontal slide signal, display area of the touchscreen into a first display window and a second display window, wherein an open button and prompt information are displayed in the first display window, and wherein the prompt information is used to prompt a user to select an application to be opened;
   displaying an application list comprising identifiers of multiple applications in the first display window in response to a click operation on the open button;
   obtaining start signals for a plurality of applications selected by the user from the identifiers in the application list;
   displaying a content of a first application of the plurality of applications in the first display window and a content of a second application of the plurality of applications in the second display window in response to obtaining start signals corresponding to the first application and the second application; and
   operating a third application of the plurality of applications in a background of the electronic device when a number of opened applications is greater than a number of display windows, wherein the third application is opened in response obtaining start signals corresponding the third application.

2. The method according to claim 1, wherein the horizontal slide signal indicates a window border shared by the first display window and the second display window.

3. The method according to claim 1, wherein an included angle between a sliding track formed by a sliding start position and a sliding end position of the horizontal slide signal and a horizontal direction of the touchscreen is less than or equal to a first threshold.

4. The method according to claim 1, wherein the method further comprises:
   obtaining a sliding touch signal from the first display window to the second display window or a sliding touch signal from the second display window to the first display window; and
   switching display content between the second display window and the first display window for displaying according to the sliding touch signal.

5. The method according to claim 2, wherein the method further comprises:
   obtaining a dragging touch signal for the window border;
   shifting a position of the window border according to the dragging touch signal for the window border;
   determining, according to the shifted position of the window border, whether any one display window of the first display window and the second display window is less than a set size;
   closing the display window that is less than the set size; and
   allocating a display area of the closed display window to another display window that shares the window border with the closed display window when the any one display window is less than the set size.

6. The method according to claim 1, wherein the method further comprises:
   obtaining a split-screen closing touch signal entered by using the touchscreen; and
   combining at least two display windows of the touchscreen into one display area according to the split-screen closing touch signal, and
   wherein the display area displays display content of any one of the display windows or displays any combination of content displayed in the display windows.

7. The method according to claim 6, wherein the split-screen closing touch signal is a slide signal along a window border of any two display windows, and wherein combining the at least two display windows of the touchscreen into one display area according to the split-screen closing touch signal comprises combining, according to the slide signal along a window border of any two display windows, the two display windows corresponding to the window border into one display window.

8. An electronic device comprising:
   a processor; and
   a touchscreen coupled to the processor and configured to send a screen splitting touch signal to the processor in response to a first slide operation on the touchscreen, wherein the screen splitting touch signal comprises a horizontal slide signal along the touchscreen, and
   wherein the processor is configured to:
      divide, according to the horizontal slide signal, a display area of the touchscreen into a first display window and a second display window, wherein an open button and prompt information is displayed in the first display window, and wherein the prompt information is used to prompt a user to select an application to be opened;
      display an application list comprising identifiers of multiple applications in the first display window in response to a click operation on the open button;

obtain start signals for a plurality of applications selected by the user from the identifiers in the application list;

display a content of a first application of the plurality of applications in the first display window and a content of a second application of the plurality of applications in the second display window in response to obtaining start signals corresponding to the first application and the second application; and operate a third application of the plurality of applications in a background of the electronic device when a number of opened applications is greater than a number of display windows, wherein the third application is opened in response obtaining start signals corresponding the third application.

9. The device according to claim 8, wherein the horizontal slide signal indicates a window border shared by the first display window and the second display window.

10. The device according to claim 8, wherein an included angle between a sliding track formed by a sliding start position and a sliding end position of the horizontal slide signal and a horizontal direction of the touchscreen is less than or equal to a first threshold.

11. The device according to claim 8, wherein the touchscreen is further configured to:
obtain a sliding touch signal from the first display window to the second display window or a sliding touch signal from the second display window to the first display window; and
send the sliding touch signal to the processor, and
wherein the processor is further configured to switch display content between the second display window and the first display window for displaying according to the sliding touch signal.

12. The device according to claim 9, wherein the touchscreen is further configured to:
obtain a dragging touch signal for the window border; and
send the dragging touch signal to the processor, and
wherein the processor is further configured to:
shift a position of the window border according to the dragging touch signal for the window border;
determine, according to the shifted position of the window border, whether any one display window of at least two display windows that share the window border is less than a set size;
close the display window that is less than the set size when the any one display window is less than the set size; and
allocate a display area of the closed display window to another display window that shares the window border with the closed display window when the any one display window is less than the set size.

13. The device according to claim 8, wherein the touchscreen is further configured to:
obtain a split-screen closing touch signal entered by using the touchscreen; and
send the split-screen closing touch signal to the processor,
wherein the processor is further configured to combine at least two display windows of the touchscreen into one display area according to the split-screen closing touch signal, and
wherein the display area displays display content of any one of the display windows or displays any combination of content displayed in the display windows.

14. The device according to claim 13, wherein the split-screen closing touch signal is a slide signal along a window border of any two display windows, and wherein the processor is configured to combine, according to the slide signal along a window border of any two display windows, the two display windows corresponding to the window border into one display window.

15. The method according to claim 1, further comprising displaying identifiers of the first application, the second application, and the third application in a taskbar in the display area of the touchscreen.

16. The method according to claim 15, further comprising switching the first application to run in the background and a content of the third application to display in the first display window in response to a selection touch signal.

17. The method according to claim 16, wherein the selection touch signal is a click touch signal of an identifier in the taskbar.

18. The method according to claim 16, wherein the selection touch signal is a dragging touch signal for dragging an identifier in the taskbar to either the first display window or the second display window in order to display the content of the application corresponding to the identifier in a selected display window.

19. The device according to claim 8, wherein the touchscreen is further configured to display identifiers of the first application, the second application, and the third application in a taskbar in the display area of the touchscreen.

20. The device according to claim 19, wherein the touchscreen is further configured to switch the first application to run in the background and a content of the third application to display in the first display window in response to a selection touch signal.

* * * * *

UNITED STATES PATENT AND TRADEMARK OFFICE
CERTIFICATE OF CORRECTION

PATENT NO. : 9,733,815 B2
APPLICATION NO. : 14/285965
DATED : August 15, 2017
INVENTOR(S) : Lin Xia and Dedong Wang Page 1 of 1

It is certified that error appears in the above-identified patent and that said Letters Patent is hereby corrected as shown below:

On the Title Page

(56) References Cited, Other Publications should read:

Foreign Communication From A Counterpart Application, Chinese Application No. 10420478940, Chinese Office Action dated May 24, 2013, 15 pages.

Page 2, Other Publications should read:

Foreign Communication From A Counterpart Application, Australian Application No. 2013348880, Australian Office Action dated April 17, 2015, 8 pages.

Foreign Communication From A Counterpart Application, Korean Application No. 10-2014-7015376, English Translation of Korean Office Action dated March 13, 2015, 3 pages.

Foreign Communication From A Counterpart Application, Japanese Application No. 2015-517601, Japanese Office Action dated September 15, 2015, 10 pages.

Signed and Sealed this
Twenty-fourth Day of October, 2017

Joseph Matal
*Performing the Functions and Duties of the
Under Secretary of Commerce for Intellectual Property and
Director of the United States Patent and Trademark Office*